US012535748B2

(12) United States Patent
Kagawa et al.

(10) Patent No.: US 12,535,748 B2
(45) Date of Patent: Jan. 27, 2026

(54) MAGNETIC TONER

(71) Applicant: CANON KABUSHIKI KAISHA, Tokyo (JP)

(72) Inventors: Hiroki Kagawa, Shizuoka (JP); Kenta Kamikura, Kanagawa (JP); Kosuke Fukudome, Tokyo (JP); Atsuhiko Ohmori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 615 days.

(21) Appl. No.: 18/046,597

(22) Filed: Oct. 14, 2022

(65) Prior Publication Data

US 2023/0122974 A1 Apr. 20, 2023

(30) Foreign Application Priority Data

Oct. 20, 2021 (JP) ................................ 2021-171623

(51) Int. Cl.
*G03G 9/083* (2006.01)
*G03G 9/087* (2006.01)

(52) U.S. Cl.
CPC ......... *G03G 9/0836* (2013.01); *G03G 9/0831* (2013.01); *G03G 9/08711* (2013.01)

(58) Field of Classification Search
CPC . G03G 9/0836; G03G 9/0831; G03G 9/08711
See application file for complete search history.

(56) References Cited

U.S. PATENT DOCUMENTS

| | | | |
|---|---|---|---|
| 8,603,712 | B2 | 12/2013 | Aoki |
| 8,614,044 | B2 | 12/2013 | Matsui |
| 8,741,519 | B2 | 6/2014 | Watanabe |
| 8,785,101 | B2 | 7/2014 | Kaya |
| 8,828,639 | B2 | 9/2014 | Kamikura |
| 8,846,284 | B2 | 9/2014 | Kinumatsu |
| 8,883,389 | B2 | 11/2014 | Matsui |
| 8,918,035 | B2 | 12/2014 | Hasegawa |
| 9,034,549 | B2 | 5/2015 | Shiotari |
| 9,040,216 | B2 | 5/2015 | Fukudome |
| 9,116,448 | B2 | 8/2015 | Terauchi |
| 9,134,637 | B2 | 9/2015 | Hotta |
| 9,141,012 | B2 | 9/2015 | Moribe |
| 9,152,065 | B2 | 10/2015 | Sano |
| 9,170,509 | B2 | 10/2015 | Masuda et al. |
| 9,213,250 | B2 | 12/2015 | Nomura |
| 9,213,251 | B2 | 12/2015 | Ohmori |
| 9,239,528 | B2 | 1/2016 | Hasegawa |
| 9,244,371 | B2 | 1/2016 | Suzumura |
| 9,256,148 | B2 | 2/2016 | Fujikawa |
| 9,261,806 | B2 | 2/2016 | Moribe |
| 9,285,697 | B2 | 3/2016 | Fukudome |
| 9,304,422 | B2 | 4/2016 | Matsui |
| 9,309,349 | B2 | 4/2016 | Watanabe |
| 9,348,246 | B2 | 5/2016 | Magome |

(Continued)

FOREIGN PATENT DOCUMENTS

| | | | |
|---|---|---|---|
| JP | 4-242262 | A | 8/1992 |
| JP | 8-320596 | A | 12/1996 |
| JP | 2002-251037 | A | 9/2002 |
| JP | 2007-47636 | A | 2/2007 |
| JP | 2009-163263 | A | 7/2009 |
| JP | 2012-198569 | A | 10/2012 |
| JP | 2014-35506 | A | 2/2014 |
| JP | 2019-40024 | A | 3/2019 |
| JP | 2019-144364 | A | 8/2019 |
| JP | 2020-16822 | A | 1/2020 |
| JP | 2020-187225 | A | 11/2020 |
| WO | 2013/047296 | A1 | 4/2013 |

OTHER PUBLICATIONS

U.S. Appl. No. 18/046,585, Yuta Komiya, Oct. 14, 2022.
U.S. Appl. No. 18/046,590, Kosuke Fukudome, Oct. 14, 2022.
U.S. Appl. No. 18/053,846, Kenta Kamikura, Nov. 9, 2022.
Robert F. Fedors, A Method for Estimating Both the Solubility Parameters and Molar Volumes of Liquids, Polymer Engineering and Science, vol. 14, No. 2 (1974) 147-54.

*Primary Examiner* — Mark F. Huff
*Assistant Examiner* — Boone Alexander Evans
(74) *Attorney, Agent, or Firm* — VENABLE LLP

(57) ABSTRACT

A magnetic toner comprising a toner particle comprising a binder resin and a magnetic body, wherein the binder resin comprises a styrene-acrylic resin, the styrene-acrylic resin comprises a monomer unit represented by Formula (1):

(1)

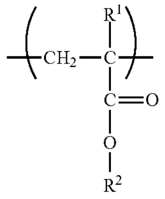

where, in Formula (1), $R^1$ represents a hydrogen atom or a methyl group; and $R^2$ represents a linear alkyl group having $C_B$ carbon atoms, $C_B$ being an integer from 10 to 15; the magnetic body comprises an alkyl group having $C_M$ carbon atoms, on a surface of the magnetic body, $C_M$ being an integer from 4 to 20; $C_B$ and $C_M$ satisfy Formula (3):

$$|C_M - C_B| \leq 10 \quad (3), \text{ and}$$

in a cross-sectional observation of the magnetic toner using a transmission electron microscope, a coefficient of variation of an occupied area ratio of the magnetic body in a specific square grid, is 80.0% or lower.

7 Claims, No Drawings

(56) References Cited

U.S. PATENT DOCUMENTS 9,354,545 B2 5/2016 Matsui
9,377,708 B2 6/2016 Magome
9,423,711 B2 8/2016 Uratani
9,429,860 B2 8/2016 Kinumatsu
9,442,416 B2 9/2016 Magome
9,470,993 B2 10/2016 Nishikawa
9,594,323 B2 3/2017 Fujikawa
9,606,462 B2 3/2017 Nomura
9,625,842 B2 4/2017 Uratani
9,625,844 B2 4/2017 Kaya
9,658,546 B2 5/2017 Tanaka
9,658,554 B2 5/2017 Kinumatsu
9,798,256 B2 10/2017 Kosaki
9,798,262 B2 10/2017 Toyoizumi
9,804,514 B2 10/2017 Suzumura
9,811,016 B2 11/2017 Aoki
9,823,595 B2 11/2017 Toyoizumi
9,841,692 B2 12/2017 Hasegawa
9,857,707 B2 1/2018 Tsuda
9,857,713 B2 1/2018 Kosaki
9,869,943 B2 1/2018 Aoki
9,880,478 B2 1/2018 Shimano
9,952,523 B2 4/2018 Shimano
9,964,874 B2 5/2018 Suzumura
9,971,263 B2 5/2018 Fukudome
10,101,683 B2 10/2018 Nishikawa
10,197,934 B2 2/2019 Matsui
10,228,627 B2 3/2019 Nagashima
10,241,430 B2 3/2019 Kimura
10,289,016 B2 5/2019 Fukudome
10,295,921 B2 5/2019 Ohmori
10,303,074 B2 5/2019 Yamawaki
10,310,396 B2 6/2019 Kamikura
10,310,397 B2 6/2019 Sano
10,338,487 B2 7/2019 Kamikura
10,345,726 B2 7/2019 Nakamura
10,353,308 B2 7/2019 Hatakeyama
10,401,750 B2 9/2019 Nakamura
10,409,180 B2 9/2019 Koji
10,429,757 B2 10/2019 Yoshida
10,503,090 B2 12/2019 Tominaga
10,539,893 B2 1/2020 Tanaka
10,539,899 B2 1/2020 Nakamura
10,545,420 B2 1/2020 Kinumatsu
10,545,422 B2 1/2020 Yamawaki
10,551,758 B2 2/2020 Tanaka
10,578,990 B2 3/2020 Tsuda
10,635,010 B2 4/2020 Kamikura
10,698,327 B2 6/2020 Nagashima
10,732,530 B2 8/2020 Matsui
10,732,532 B1 8/2020 Sugawara et al.
10,747,134 B2 8/2020 Watanabe
10,768,540 B2 9/2020 Watanabe
10,782,623 B2 9/2020 Yoshiba
10,845,722 B2 11/2020 Nishikawa
10,859,933 B2 12/2020 Kinumatsu
10,877,387 B2 12/2020 Fukudome
10,877,388 B2 12/2020 Aoki
10,877,389 B2 12/2020 Kamikura
10,895,815 B2 1/2021 Kamikura
10,969,704 B2 4/2021 Kagawa
11,003,103 B2 5/2021 Kinumatsu
11,092,905 B2 8/2021 Fukudome
11,099,493 B2 8/2021 Komiya
11,112,708 B2 9/2021 Uratani
11,112,709 B2 9/2021 Saeki
11,112,713 B2 9/2021 Akiyama
11,169,458 B2 11/2021 Toyoizumi
11,175,600 B2 11/2021 Uchiyama
11,181,839 B2 11/2021 Yamashita
11,181,840 B2 11/2021 Nagata
11,181,844 B2 11/2021 Nagaoka
11,181,846 B2 11/2021 Kinumatsu
11,256,187 B2 2/2022 Ogaki
11,287,758 B2 3/2022 Matsui
11,314,178 B2 4/2022 Kenmoku
11,333,989 B2 5/2022 Unno
11,347,157 B2 5/2022 Kamikura
11,415,902 B2 8/2022 Watanabe
11,531,282 B2 12/2022 Kamikura
11,822,286 B2 11/2023 Kenmoku
2002/0009661 A1* 1/2002 Hashimoto ........ G03G 9/08708
430/110.3
2004/0013961 A1 1/2004 Niwa et al.
2015/0185648 A1 7/2015 Uratani
2016/0378003 A1 12/2016 Arimura
2017/0160662 A1* 6/2017 Nagashima ........ G03G 9/08782
2017/0307991 A1 10/2017 Kadonome et al.
2019/0056678 A1 2/2019 Washino et al.
2019/0094732 A1 3/2019 Matsushima et al.
2019/0137900 A1* 5/2019 Nakagawa ......... G03G 9/08797
2021/0080846 A1 3/2021 Mizuguchi
2021/0181647 A1 6/2021 Hashimoto et al.
2021/0255557 A1 8/2021 Watanabe
2021/0302856 A1 9/2021 Nagashima
2022/0146952 A1 5/2022 Komiya
2022/0146955 A1 5/2022 Nozaki
2022/0206402 A1 6/2022 Uratani
2022/0214629 A1 7/2022 Kenmoku
2022/0214630 A1 7/2022 Kamikura
2022/0373906 A1 11/2022 Ohmori
2022/0373916 A1 11/2022 Adachi
2023/0116451 A1 4/2023 Uratani
2023/0119795 A1 4/2023 Saeki

* cited by examiner

MAGNETIC TONER

BACKGROUND OF THE INVENTION

Field of the Invention

The present disclosure relates to a magnetic toner used in copiers and printers relying on electrophotographic and electrostatic recording methods.

Description of the Related Art

Recent years have witnessed a growing demand for energy savings in electrophotographic image forming apparatuses, coupled with requirements for improving the low-temperature fixability of toner, with a view to reducing the amount of heat used in fixing of the toner. Various studies have been conducted on binder resins used in toners, for the purpose of improving the low-temperature fixability of the toner. Some such studies are concerned with styrene-acrylic resins having incorporated therein a long-chain alkyl (meth) acrylate, which is an ester of (meth)acrylic acid and an alcohol having a linear alkyl group, as binder resins that exhibit excellent melting characteristics. Styrene-acrylic resins having a long-chain alkyl (meth)acrylate incorporated therein characteristically exhibit high mobility of molecular chains and high compatibility with plasticizers.

As a prior example directed at improving low-temperature fixability, Japanese Patent Application Publication No. 2014-035506 proposes a toner that contains a styrene-acrylic resin having structural units derived from an alkyl (meth) acrylate ester monomer having an alkyl group having 8 to 22 carbon atoms.

Styrene-acrylic resins having long-chain alkyl (meth) acrylates incorporated therein have also been studied in magnetic toners.

Japanese Patent Application Publication No. H08-320596 proposes a toner that contains a styrene-acrylic resin having structural units derived from an alkyl (meth)acrylate ester monomer, the alkyl group of which has 12 or more carbon atoms, and a magnetic body.

SUMMARY OF THE INVENTION

However, study on Japanese Patent Application Publication No. H08-320596 by the inventors has revealed a problem in scratch resistance in the toner disclosed therein, in that the toner exhibits low resistance to rubbing of a fixed image surface, whereby, upon piling and transporting large amounts of printed matter, e.g., direct mail, other printed matter may become contaminated.

The present disclosure, arrived at in the light of the above problem, provides a magnetic toner that can exhibit excellent low-temperature fixability and that affords excellent scratch resistance in fixed images.

The present disclosure relates to a magnetic toner comprising a toner particle comprising a binder resin and a magnetic body, wherein the binder resin comprises a styrene-acrylic resin, the styrene-acrylic resin comprises a monomer unit represented by Formula (1) below:

where, in Formula (1), $R^1$ represents a hydrogen atom or a methyl group; and $R^2$ represents a linear alkyl group having $C_B$ carbon atoms, $C_B$ being an integer from 10 to 15;

the magnetic body comprises an alkyl group having $C_M$ carbon atoms, on a surface of the magnetic body, $C_M$ being an integer from 4 to 20;

$C_B$ and $C_M$ satisfy Formula (3) below:

$$|C_M - C_B| \le 10 \quad (3),\text{ and}$$

in a cross-sectional observation of the magnetic toner using a transmission electron microscope, a coefficient of variation of an occupied area ratio of the magnetic body in a square grid, resulting from demarcating a cross section of the magnetic toner in a grid of 0.8 μm-side squares, is 80.0% or lower.

Further, the present disclosure relates to a magnetic toner comprising a toner particle comprising a binder resin and a magnetic body, wherein the binder resin comprises a styrene-acrylic resin, the styrene-acrylic resin comprises monomer unit represented by Formula (1) below:

where, in Formula (1), $R^1$ represents a hydrogen atom or a methyl group; and $R^2$ represents a linear alkyl group having $C_B$ carbon atoms, $C_B$ being an integer from 10 to 15;

the magnetic body is a surface-treated product having been surface-treated with a compound having an alkyl group having $C_M$ carbon atoms, $C_M$ being an integer from 4 to 20;

$C_B$ and $C_M$ satisfy Formula (3) below:

$$|C_M - C_B| \le 10 \quad (3),\text{ and}$$

in a cross-sectional observation of the magnetic toner using a transmission electron microscope, a coefficient of variation of an occupied area ratio of the magnetic body in a square grid, resulting from demarcating a cross section of the magnetic toner in a grid of 0.8 μm-side squares, is 80.0% or lower.

(1)

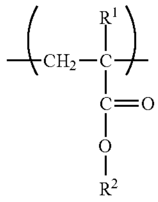

In Formula (1), $R^1$ represents a hydrogen atom or a methyl group, $R^2$ represents a linear alkyl group having $C_B$ carbon atoms, and $C_B$ is an integer from 10 to 15.

The present disclosure allows providing a toner that is excellent in low-temperature fixability, and which affords excellent scratch resistance in fixed images. Further features of the present invention will become apparent from the following description of exemplary embodiments.

DESCRIPTION OF THE EMBODIMENTS

Unless otherwise specified, descriptions of numerical ranges such as "from XX to YY" or "XX to YY" in the present disclosure include the numbers at the upper and lower limits of the range. When numerical ranges are described in stages, the upper and lower limits of each of each numerical range may be combined arbitrarily. The term "monomer unit" describes a reacted form of a monomeric material in a polymer, and one carbon-carbon bonded section in a principal chain of polymerized vinyl-based monomers in a polymer is given as one unit. The vinyl-based monomer can be represented by the following formula (Z).

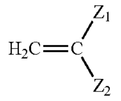

(Z)

In formula (Z), $Z_1$ represents a hydrogen atom or alkyl group (preferably an alkyl group having 1 to 3 carbon atoms, or more preferably a methyl group), and $Z_2$ represents any substituent.

The inventors conjecture the following concerning the underlying reasons why the scratch resistance of the magnetic toner of Japanese Patent Application Publication No. H08-320596 decreases readily.

As described above, a toner containing a binder resin in the form of a styrene-acrylic resin having a long-chain alkyl (meth)acrylate incorporated therein exhibits excellent melting characteristics. On the other hand, a resin having a long-chain alkyl (meth)acrylate incorporated therein has a linear alkyl group, and accordingly molecular chains have high mobility and are readily deformed by external forces. Therefore, it is deemed that in a case where the styrene-acrylic resin is used in a magnetic toner, the adhesiveness of the magnetic body present on the image surface to the toner particle, after fixing, is accordingly weak.

The toner proposed in Japanese Patent Application Publication No. H08-320596 is a pulverized toner that utilizes a binder resin in the form of a styrene-acrylic resin having a long-chain alkyl (meth)acrylate incorporated thereinto, and in which untreated iron oxide is used as a magnetic body; however, Japanese Patent Application Publication No. H08-320596 contemplates no scheme that should improve adhesiveness between the binder resin and the magnetic body. It is therefore inferred that the surface of the image becomes rubbed upon overlay and conveyance of paper sheets, and the magnetic body comes off the toner giving rise to contamination of other paper sheets.

Therefore, the inventors investigated toners having high adhesiveness of a magnetic body towards a binder resin, and boasting excellent scratch resistance, on the surface of a fixed image. As a result of diligent research the inventors found that the above effects can be brought out by designing a binder resin and a magnetic body, contained in the toner, in the below-described manner.

That is, the present disclosure relates to a magnetic toner comprising a toner particle comprising a binder resin and a magnetic body, wherein the binder resin comprises a styrene-acrylic resin, the styrene-acrylic resin comprises a monomer unit represented by Formula (1) below:

where, in Formula (1), $R^1$ represents a hydrogen atom or a methyl group; and $R^2$ represents a linear alkyl group having $C_B$ carbon atoms, $C_B$ being an integer from 10 to 15;

the magnetic body comprises an alkyl group having $C_M$ carbon atoms, on a surface of the magnetic body, $C_M$ being an integer from 4 to 20;

$C_B$ and $C_M$ satisfy Formula (3) below:

$$|C_M - C_B| \leq 10 \quad (3), \text{ and}$$

in a cross-sectional observation of the magnetic toner using a transmission electron microscope, a coefficient of variation of an occupied area ratio of the magnetic body in a square grid, resulting from demarcating a cross section of the magnetic toner in a grid of 0.8 μm-side squares, is 80.0% or lower.

Further, the present disclosure relates to a magnetic toner comprising a toner particle comprising a binder resin and a magnetic body, wherein the binder resin comprises a styrene-acrylic resin, the styrene-acrylic resin comprises monomer unit represented by Formula (1) below:

where, in Formula (1), $R^1$ represents a hydrogen atom or a methyl group; and $R^2$ represents a linear alkyl group having $C_B$ carbon atoms, $C_B$ being an integer from 10 to 15;

the magnetic body is a surface-treated product having been surface-treated with a compound having an alkyl group having $C_M$ carbon atoms, $C_M$ being an integer from 4 to 20;

$C_B$ and $C_M$ satisfy Formula (3) below:

$$|C_M - C_B| \leq 10 \quad (3), \text{ and}$$

in a cross-sectional observation of the magnetic toner using a transmission electron microscope, a coefficient of variation of an occupied area ratio of the magnetic body in a square grid, resulting from demarcating a cross section of the magnetic toner in a grid of 0.8 μm-side squares, is 80.0% or lower.

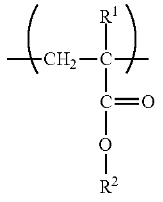

(1)

In Formula (1), $R^1$ represents a hydrogen atom or a methyl group, $R^2$ represents a linear alkyl group having $C_B$ carbon atoms, and $C_B$ is an integer from 10 to 15.

Underlying Mechanism of the Effects

The inventors surmise that the mechanism by virtue of which the above effect is brought out is as follows.

The monomer units represented by Formula (1) (hereafter also referred to as long-chain acrylate units) have a linear alkyl group, and accordingly the mobility of the molecular chain is high. Therefore, a resin having long-chain acrylate units exhibits high mobility at the time of melting, and tends to have lower viscosity. When used as a binder resin for toner, therefore, such a resin boasts excellent low-temperature fixability.

The binder resin and magnetic body of the toner of the present disclosure have alkyl groups with a specific carbon number. An instance where the carbon number of these alkyl groups satisfies Formula (3) signifies that the structures of the alkyl groups are mutually similar. Given that the structures of the alkyl groups are similar, it is considered that the alkyl groups become oriented after fixing. Such orientation is deemed to be particularly likely to occur in a resin having long-chain acrylate units of high molecular chain mobility; the above effects exploit thus the high degree of mobility of the molecular chains, which in the resin on its own is disadvantageous in terms of scratch resistance. It is surmised that adhesiveness between the binder resin and the magnetic body is improved, and detachment of the magnetic body is suppressed, by virtue of such orientation.

In a cross-sectional observation of the toner of the present disclosure using a transmission electron microscope, a coefficient of variation (CV) of the occupied area ratio of the magnetic body in a square grid, resulting from demarcating a cross section of the magnetic toner in a grid of 0.8 μm-side squares, is 80.0% or lower. This indicates that the magnetic body in the binder resin is uniformly dispersed. It is considered that through uniform dispersion of the magnetic body in the toner, the fraction of magnetic bodies that cannot elicit the effect of improving adhesiveness derived from orientation is reduced, and scratch resistance is improved.

The toner particle comprises a binder resin and a magnetic body. Various configurational requirements will be explained next.

Binder Resin

The binder resin comprises a styrene-acrylic resin comprising monomer units represented by Formula (1) below.

(1)

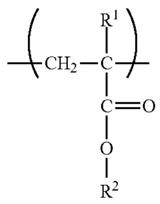

In Formula (1), $R^1$ represents a hydrogen atom or a methyl group, and $R^2$ represents a linear alkyl group having $C_B$ carbon atoms, such that $C_B$ is an integer from 10 to 15.

The long-chain acrylate units represented by Formula (1) have a linear alkyl group $R^2$. By virtue of the fact that the long-chain acrylate units have the linear alkyl group $R^2$, the linear alkyl group $R^2$ is oriented with the alkyl groups on the surface of the magnetic body, and adhesiveness to the magnetic body can be improved. Given also the high mobility of the linear alkyl group $R^2$, mobility at the time of melting of the binder resin is likewise high, and an effect is brought out of lowering the viscosity of the binder resin. Effects of improving low-temperature fixability and scratch resistance can be obtained as a result.

When $C_B$ is 10 or more, the effect of lowering the viscosity of the binder resin can be readily achieved, and low-temperature fixability is improved. When $C_B$ is 15 or less, orientation of the linear alkyl groups in the resin and the alkyl groups on the magnetic body surface occurs preferentially over orientation of the linear alkyl groups in the binder resin, and accordingly adhesiveness between the binder resin and the magnetic body is improved, and scratch resistance is likewise improved. Herein $C_B$ is preferably from 12 to 14, and is more preferably 12.

The content ratio of the monomer units represented by Formula (1) in the styrene-acrylic resin is preferably from 1.0 mass % to 15.0 mass %. When the content ratio of the monomer units represented by Formula (1) is from 1.0 mass % to 15.0 mass %, the viscosity-lowering effect is more pronounced, and low-temperature fixability is improved as a result. In addition, orientation of the linear alkyl groups of the monomer units represented by Formula (1) is suppressed, and orientation with the alkyl groups on the surface of the magnetic body is promoted; as a result, adhesiveness between the binder resin and the magnetic body is improved, and scratch resistance is improved. The content ratio of the monomer units represented by Formula (1) in the styrene-acrylic resin is more preferably from 2.0 mass % to 10.0 mass %.

The styrene-acrylic resin may have monomer units represented by Formula (5) below, other than the monomer units represented by Formula (1).

(5)

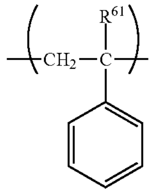

In formula (5), $R^{61}$ represents a hydrogen atom or a methyl group.

The content ratio of the monomer units represented by Formula (5) in the styrene-acrylic resin is preferably from 1.0 mass % to 99.0 mass %, more preferably from 50.0 mass % to 90.0 mass %, and yet more preferably from 65.0 mass % to 85.0 mass %.

The SP value of the styrene-acrylic resin is herein SPb $(J/cm^3)^{1/2}$. Preferably, SPb is from 19.50 to 20.40, from the viewpoint of readily increasing the affinity of the magnetic body with a below-described ester compound. More preferably, SPb is from 19.80 to 20.10. Herein SPb can be controlled on the basis of the type and amount of units that make up the styrene-acrylic resin.

The weight-average molecular weight of the styrene-acrylic resin is preferably from 10000 to 500000. The weight-average molecular weight can be controlled for instance on the basis of the reaction temperature and the amount of initiator during production of the styrene-acrylic resin.

The glass transition temperature of the styrene-acrylic resin is preferably from 40° C. to 60° C. The glass transition temperature can be controlled for instance on the basis of the type and amount of units that make up the styrene-acrylic resin.

The content ratio of the styrene-acrylic resin in the binder resin is preferably 90.0 mass % or higher. When the content ratio of the styrene-acrylic resin is 90.0 mass % or higher, the long-chain acrylate units contained in the styrene-acrylic resin are uniformly dispersed in the binder resin. As a result, the long-chain acrylate units and the magnetic body sufficiently interact with each other, and scratch resistance is improved. The upper limit of the content ratio of the styrene-acrylic resin is not particularly restricted, but is ordinarily 100.0 mass % or lower.

As the binder resin also a conventionally known resin can be used simultaneously with the styrene-acrylic resin, as needed, without any particular limitations. Examples of binder resins that can be used simultaneously with the styrene-acrylic resin include vinyl resins, polyester resins, polyurethane resins and polyamide resins, other than styrene-acrylic resins.

Polymerizable Monomer

The styrene-acrylic resin may be obtained by polymerization. The polymerizable monomer that forms the monomer units represented by Formula (1) may be for instance an acrylic acid ester or methacrylic acid ester having an alkyl group having 10 to 15 carbon atoms, such as decyl acrylate, decyl methacrylate, lauryl acrylate, lauryl methacrylate, myristyl acrylate, myristyl methacrylate, pentadecyl acrylate and pentadecyl methacrylate. Preferably used among the foregoing is lauryl acrylate, lauryl methacrylate, myristyl acrylate or myristyl methacrylate; yet more preferably lauryl acrylate or lauryl methacrylate is used.

Examples of the polymerizable monomer that forms the monomer units represented by Formula (5) include styrene and α-methylstyrene. Styrene is preferably used among the foregoing.

In addition to the monomer units represented by Formula (1), the styrene-acrylic resin may have monomer units derived from known other polymerizable monomers, without particular limitations.

Such other polymerizable monomers include monofunctional monomers having one polymerizable unsaturated bond in the molecule, for instance acrylic acid esters such as methyl acrylate and n-butyl acrylate (n-butyl acrylate); methacrylic acid esters such as methyl methacrylate, 2-hydroxyethyl methacrylate, t-butyl methacrylate and 2-ethylhexyl methacrylate; unsaturated carboxylic acids such as acrylic acid and methacrylic acid; unsaturated dicarboxylic acids such as maleic acid; unsaturated dicarboxylic acid anhydrides such as maleic anhydride; nitrile-based vinyl monomers such as acrylonitrile; halogen-containing vinyl monomers such as vinyl chloride; nitro-based vinyl monomers such as nitrostyrene; as well as multifunctional monomers having a plurality of polymerizable unsaturated bonds in the molecule, such as divinylbenzene, 1,6-hexanediol diacrylate, 1,9-nonanediol diacrylate and trimethylolpropane tri(meth)acrylate.

Preferably among the foregoing there are used acrylic acid esters or methacrylic acid esters (preferably such that the carbon number of the alkyl group thereof is 1 to 8 (more preferably 1 to 4)), and more preferably n-butyl acrylate. The content ratio of monomer units derived from a (meth) acrylic acid ester such that the carbon number of the alkyl group thereof is 1 to 8 (more preferably 1 to 4) is preferably 0.0 mass % to 45.0 mass %, more preferably 5.0 mass % to 35.0 mass %. The content ratio of monomer units derived from n-butyl acrylate in a resin A is preferably from 0.0 mass % to 25.0 mass %.

Magnetic Body

Magnetic bodies include iron oxides typified by magnetite, maghemite and ferrite; and metals typified by iron, cobalt and nickel, as well as alloys of these metals with metals such as aluminum, cobalt, copper, magnesium, zinc, antimony, beryllium, bismuth, calcium, manganese, selenium, titanium and tungsten or oxides thereof, as well as mixtures of the foregoing. Magnetite is preferably used among the above.

The magnetic body comprises, on the surface thereof, alkyl groups having $C_M$ carbon atoms, where $C_M$ is an integer from 4 to 20.

When $C_M$ is 4 or more, the alkyl groups on the surface of the magnetic body become readily oriented with the long-chain acrylate units of the styrene-acrylic resin. Therefore, adhesiveness between the binder resin and the magnetic body is improved, and scratch resistance is likewise improved. Preferably, $C_M$ is 6 or more, and more preferably 8 or more. When $C_M$ is 20 or less, coalescing of the magnetic body is suppressed, and the dispersion of the magnetic body in the binder resin is improved. Further, $C_M$ is preferably 16 or less, and more preferably 14 or less.

The term "the magnetic body comprises alkyl groups on the surface" encompasses for instance a form in which a compound comprising an alkyl group is physically adsorbed onto the surface of the magnetic body, and a form in which a compound comprising an alkyl group and the surface of the magnetic body form chemical bonds as a result of a chemical reaction between the foregoing.

Further, $C_B$ and $C_M$ satisfy Formula (3) below.

$$|C_M - C_B| \leq 10 \quad (3),$$

In a case where $C_B$ and $C_M$ satisfy Formula (3), the structure of the linear alkyl group $R^2$ of the long-chain acrylate units represented by Formula (1), and the structure of the alkyl group of the magnetic body are similar, and as a result the foregoing alkyl groups become readily oriented with each other. Therefore, adhesiveness between the binder resin and the magnetic body is improved, detachment of the magnetic body is suppressed, and scratch resistance is improved. Preferably, $C_B$ and $C_M$ satisfy Formula (4) below.

$$|C_M - C_B| \leq 8 \quad (4)$$

The magnetic body is preferably a surface-treated product having been surface-treated with a compound having an alkyl group. The surface treatment agent having an alkyl group is not particularly limited, and examples thereof include silane coupling agents, alkyl-modified silicones, fatty acids and titanium coupling agents.

The surface treatment method of the magnetic body is not particularly limited so long as it is a treatment method that utilizes a compound having an alkyl group. Examples include for instance wet methods in which a powder to be treated is dispersed in a solvent such as water or an organic solvent, using for instance a mechanochemical-type mill such as a ball mill or a sand grinder, after which the dispersed powder is mixed with a surface treatment agent, and the solvent is removed, with drying; a dry method in which the powder to be treated and the surface treatment agent are mixed in a Henschel mixer, a Super mixer, a Mix-Muller or the like, followed by drying; and a method in which a treatment is performed by bringing into contact the powder to be treated, and the surface treatment agent, in a high-speed air flow such as that of a jet mill. A dry method using a Mix-Muller is preferably resorted to among the foregoing.

The form of the surface-treated product having undergone a surface treatment, is not particularly limited, and for instance may be a form in which a compound having an alkyl group is physically adsorbed onto the surface of the magnetic body, or a form in which a chemical reaction is elicited between a compound having an alkyl group and the surface of the magnetic body, to form chemical bonds.

Preferably, when SPm $(J/cm^3)^{1/2}$ is defined as the SP value of the surface treatment agent, SPm is preferably from 17.00 to 19.00, from the viewpoint of readily increasing the affinity between the styrene-acrylic resin and the below-described ester compound. More preferably, SPm is from 17.40 to 18.20. The SP value of the surface treatment agent denotes the SP value of the form that results after a reaction of the surface treatment agent with the surface of the magnetic body. The method for calculating the SP value will be described further on.

The absolute value of SPb−SPm is preferably 3.00 or less. When the absolute value of SPb−SPm is 3.00 or less, the alkyl groups of the surface treatment agent and the linear alkyl groups $R^2$ of the long-chain acrylate units represented by Formula (1) become readily oriented, and scratch resistance is improved as a result. The absolute value of the difference between SPb and SPm is more preferably 2.10 or less.

The number-average particle diameter of the primary particles of the magnetic body is preferably from 50 nm to 500 nm, more preferably from 100 nm to 300 nm, and yet more preferably from 150 nm to 250 nm.

Further, the standard deviation of the number-average particle diameter is preferably from 50 nm to 90 nm. More preferably, the standard deviation is from 60 nm to 80 nm. By virtue of the fact that the standard deviation of the number-average particle diameter of the primary particles of the magnetic body lies within the above ranges, a magnetic body of comparatively large particle diameter, exhibiting good dispersibility and increased toner thermal conductivity, and a magnetic body of comparatively small particle diameter, which is advantageous in terms of low-temperature fixability, are present with a good balance therebetween, and thus fixing performance is improved in images such as whole-surface solid images, in which the toner carrying amount is large and heat is not readily transferred to the to the totality of the toner. The standard deviation of the number-average particle diameter of the primary particles of the magnetic body can be arbitrarily controlled through adjustment of the conditions of an oxidation reaction during the production of the magnetic body.

The content of the magnetic body in the toner is preferably from 40 parts by mass to 120 parts by mass, and more preferably from 50 parts by mass to 100 parts by mass, relative to 100 parts by mass of the binder resin.

Low-temperature fixability and control of the dispersibility of the magnetic body can both be readily achieved if the content of the magnetic body lies within the above range.

Dispersion State of Magnetic Body in Toner

In a cross-sectional observation of the magnetic toner using a transmission electron microscope, a coefficient of variation (CV) of the occupied area ratio of the magnetic body in a square grid, resulting from demarcating a cross section of the magnetic toner in a grid of 0.8 μm-side squares, is 80.0% or lower. The coefficient of variation of an occupied area ratio of the magnetic body is more preferably 60.0% or lower. The lower limit of the coefficient of variation of the occupied area ratio of the magnetic body is not particularly restricted, but is ordinarily 0% or higher. A coefficient of variation of the occupied area ratio of the magnetic body lying in the above range is indicative of uniform dispersion of the magnetic body in the toner. The fraction of magnetic bodies that cannot elicit the effect of improving adhesiveness derived from orientation is reduced, and scratch resistance is improved, as a result of uniform dispersion of the magnetic body in the toner.

In a cross-sectional observation of the magnetic toner using a transmission electron microscope, the average value of the occupied area ratio of the magnetic body in the square grid resulting from demarcating a cross section of the magnetic toner in a grid of 0.8 μm-side squares, is preferably from 10.0% to 50.0%. The above average value is more preferably from 20.0% to 40.0%. In a case where the average value of the occupied area ratio lies in the above range, the dispersion state of the magnetic body in the toner is appropriate, and there decreases the fraction of magnetic body that cannot elicit the effect of improving the adhesiveness derived from orientation with the binder resin. Scratch resistance is improved as a result.

The dispersion state of the magnetic body in the toner can be controlled on the basis of for instance a combination of the resin material and the magnetic body used in the toner, and on the basis of the production method conditions of the toner.

Thermal Conductivity of the Toner

The thermal conductivity of the magnetic toner as measured in accordance with a hot-disk method is preferably 0.190 W/mK or higher, and more preferably 0.200 W/mK or higher. By setting the thermal conductivity of the toner to lie within the above range, it becomes possible to efficiently transfer heat from a fixing unit to toner on a medium, in a fixing nip, and thus there is improved fixing performance in images, such as whole-surface solid images, in which the toner carrying amount is large and heat is not readily transferred to the totality of the toner. The upper limit of the thermal conductivity of the magnetic toner is not particularly restricted, but is ordinarily 0.300 W/mK or lower.

The thermal conductivity of the magnetic toner can be controlled by adjusting the content and dispersion state of the magnetic body. Ordinarily, thermal conductivity tends to increase with increasing content of magnetic particles, and with increasing dispersibility.

Ester Compound

The toner comprises at least one ester compound selected from the group consisting of the ester compound represented by Formula (6) below, the ester compound represented by Formula (7) below, and the ester compound represented by Formula (8) below.

(6)

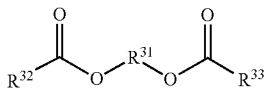

(7)

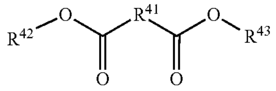

(8)

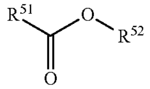

In Formulae (6), (7) and (8), $R^{31}$ and $R^{41}$ represent each independently an alkylene group having 2 to 8 carbon atoms, and $R^{32}$, $R^{33}$, $R^{42}$, $R^{43}$, $R^{51}$ and $R^{52}$ represent each independently a linear alkyl group having 14 to 24 (preferably 16 to 24, and more preferably 17 to 22) linear alkyl group.

The above ester compound exhibits high compatibility with the styrene-acrylic resin, and accordingly a viscosity-lowering effect can be obtained at a lower temperature, through the use of the above ester compound; low-temperature fixability is thus improved.

Herein when SPw $(J/cm^3)^{1/2}$ is defined as the SP value of the ester compound, SPw is preferably from 17.50 to 18.50, from the viewpoint of readily increasing the affinity between the styrene-acrylic resin and the magnetic body. More preferably, SPw is from 17.90 to 18.30, and yet more preferably SPw is from 18.00 to 18.20. The value of SPw can be controlled on the basis of the carbon number and the number of ester bonds of the linear alkyl group contained in the ester compound.

The absolute value of SPb-SPw is preferably 2.50 or less. When the absolute value of SPb-SPw is 2.50 or less, the ester compound intermixes readily with the styrene-acrylic resin, and low-temperature fixability is improved as a result. Further, exudation of the ester compound onto the toner surface in a high-temperature environment is suppressed thanks to orientation with the linear alkyl groups $R^2$ of the long-chain acrylate units represented by Formula (1). Heat-resistant storability is improved as a result. The absolute value of SPb-SPw is more preferably 2.10 or less, and yet more preferably 2.00 or less.

The absolute value of SPm-SPw is preferably 1.10 or less. When the absolute value of SPm-SPw is 1.10 or less, the ester compound is readily compatible with the alkyl groups of the magnetic body, and the surface of the magnetic body is readily covered with the ester compound. As a result, friction on the surface of the magnetic body is reduced, and the magnetic body on the fixed image surface does not detach readily when rubbed. Scratch resistance is significantly improved as a result. The absolute value of SPm-SPw is more preferably 0.70 or less, and yet more preferably 0.60 or less.

The ester compounds represented by Formulae (6) to (8) have a linear structure, and accordingly exhibit sharp melting characteristics; in addition, the compounds have multiple ester bonds in the respective molecules, thanks to which the difference in SP value with respect to the styrene-acrylic resin is easily controlled. The effect of lowering the viscosity of the toner is made yet more pronounced as a result.

Examples of the ester compound represented by Formula (6) include ethylene glycol dipalmitate, ethylene glycol distearate, ethylene glycol dieicosanate, ethylene glycol dibehenate, ethylene glycol ditetracosanate, butanediol distearate, butanediol dibehenate, hexanediol distearate, hexanediol dibehenate, octanediol distearate and octanediol dibehenate.

Examples of the ester compound represented by Formula (7) include distearyl succinate, dibehenyl succinate, distearyl adipate, dibehenyl adipate, distearyl suberate, dibehenyl suberate, distearyl sebacate and dibehenyl sebacate.

Examples of the ester compound represented by Formula (8) include palmityl palmitate, stearyl palmitate, behenyl palmitate, palmityl stearate, stearyl stearate, behenyl stearate, palmityl behenate, stearyl behenate and behenyl behenate.

Among the foregoing there are preferably used an ester compound represented by Formula (6) or represented by Formula (7), and more preferably ethylene glycol distearate, since in that case compatibility with the styrene-acrylic resin having the long-chain acrylate units represented by Formula (1) is readily increased.

The content of the ester compound is preferably from 1.0 parts by mass to 40.0 parts by mass, more preferably from 3.0 parts by mass to 30.0 parts by mass, and yet more preferably from 5.0 parts by mass to 25.0 parts by mass, relative to 100.0 parts by mass of the binder resin.

The melting point of the ester compound is preferably from 65° C. to 90° C., and more preferably from 70° C. to 85° C.

Release Agent

The toner particle may contain also a known wax as a release agent, besides the specific ester compound above.

A hydrocarbon wax is preferable as the release agent, since hydrocarbon waxes exhibit high phase separability with styrene-acrylic resins and accordingly afford a pronounced release effect. Hydrocarbon waxes include aliphatic hydrocarbon waxes such as low molecular weight polyethylene, low molecular weight polypropylene, microcrystalline waxes, paraffin wax and Fischer-Tropsch waxes; oxides of hydrocarbon waxes or block copolymers thereof, such as polyethylene oxide wax; as well as aliphatic hydrocarbon waxes grafted with styrene or a vinylic monomer such as acrylic acid.

The content of the release agent other than the ester compound is preferably 0.1 to 20 parts by mass, more preferably 1 to 10 parts by mass, relative to 100 parts by mass of the binder resin.

Charge Control Agent

The toner may contain a charge control agent for the purpose of stabilizing charging performance.

The charge control agent is not particularly limited, but preferably there is used an organometallic complex or a chelate compound in which an acid group or a hydroxyl group present at a terminal of the binder resin and a central metal interact readily with each other.

Concrete examples include monoazo metal complexes; acetylacetone metal complexes; metal complexes or metal salts of aromatic hydroxycarboxylic acids or aromatic dicarboxylic acids.

Average Circularity of the Toner

The average circularity of the toner is preferably from 0.910 to 0.995. The surface of the image after fixing tends to be smooth, and scratch resistance is further improved, when the average circularity of the toner lies in the above range. More preferably, the average circularity of the toner is from 0.930 to 0.995, and yet more preferably from 0.940 to 0.995. The method for measuring the average circularity of the toner will be described further on.

A method for producing a toner of the present disclosure will be described in detail hereafter.

The method for producing the magnetic toner is not particularly limited, and a known production method such as pulverization, suspension polymerization, dissolution suspension, emulsification aggregation or dispersion polymerization can be resorted to. Preferred among the foregoing is a pulverization method, which allows controlling the dispersibility of the magnetic body to a high degree.

Pulverization Method

A pulverization method will be described in detail below (i) The binder resin and magnetic body making up the toner particle, and as needed, a wax and other additives, are thoroughly mixed in a mixer such as FM mixer (by Nippon Coke & Engineering Co. Ltd.), to prepare a mixture that contains the binder resin and the magnetic body.

(ii) The obtained mixture is melt-kneaded using a thermal kneading machine such as a TEX twin-screw kneading machine (by Japan Steel Works, Ltd.), to cause the resins to melt and intermix with each other. The magnetic body and other additives are dispersed or dissolved therein, to prepare a kneaded product.

(iii) The obtained kneaded product is cooled and solidified, and is thereafter pulverized, to prepare a pulverized product.

(iv) The obtained pulverized product is for instance classified, to yield a toner particle.

In order to control the shape and surface properties of the toner particle, a surface treatment step may be included in which the toner particle obtained by classification or the like is caused to pass through a surface treatment device that continuously applies a mechanical impact force.

The surface profile of the toner particle can be controlled by controlling the duration of the treatment in this surface treatment step.

Examples of mixers include the following.

FM mixer (by Nippon Coke & Engineering Co., Ltd.); Super mixer (by Kawata Manufacturing Co., Ltd.); Ribocone (by Okawara Mfg. Co., Ltd.); Nauta Mixer, Turbulizer and Cyclomix mixer (by Hosokawa Micron Corporation); Spiral pin mixer (by Pacific Machinery & Engineering Co., Ltd.), or a Loedige mixer (by Chuo Kiko Co., Ltd.).

Examples of kneading machines include the following.

KRC kneader (by Kurimoto, Ltd.); Buss Co-Kneader (by Buss AG); TEM extruder (by Toshiba Machine Co., Ltd.);

TEX twin-screw kneader (by Japan Steel Works, Ltd.); PCM kneader (by Ikegai Corp); a triple roll mill, a mixing roll mill and a kneader (by Inoue Mfg., Inc.); Kneadex (by Mitsui Mining Co., Ltd.); MS Pressure kneader or Kneader-Ruder (by Moriyama Seisakusho Ltd.), or Banbury Mixer (by Kobe Steel, Ltd.).

Examples of pulverizing machines include the following.

Counter Jet Mill, Micron Jet or Inomizer (by Hosokawa Micron Corporation); IDS Mill or PJM Jet pulverizer (by Nippon Pneumatic Mfg. Co., Ltd.); Cross Jet Mill (by Kurimoto, Ltd.); Ulmax (by Nisso Engineering Co., Ltd.); SK Jet-O-Mill (by Seishin Enterprise Co., Ltd.); Kryptron (by Kawasaki Heavy Industries, Ltd.); Turbo Mill (by Freund-Turbo Corporation); and Super Rotor (by Nisshin Engineering Inc.).

Examples of classifiers include the following.

Classiel, Micron Classifier and Spedic Classifier (by Seishin Enterprise Co., Ltd.); Turbo Classifier (by Nisshin Engineering Inc.); Micron Separator and Turboplex (by ATP Ltd.); TSP Separator (by Hosokawa Micron Corporation); Elbow Jet (by Nittetsu Mining Co., Ltd.); Dispersion Separator (by Nippon Pneumatic Mfg. Co., Ltd.); and YM Microcut (by Yasukawa Shoji Ltd.).

Examples of surface modification devices include the following.

Faculty (by Hosokawa Micron Corporation), Mechanofusion (by Hosokawa Micron Corporation), Nobilta (by Hosokawa Micron Corporation), Hybridizer (by Nara Machinery Co., Ltd.), Inomizer (by Hosokawa Micron Corporation), Theta Composer (by Tokuju Kosakusho Ltd.), and Mechanomill (by Okada Seiko Ltd.).

Examples of sieving devices used for sieving coarse particles include the following.

Ultrasonic (by Koei Sangyo Co., Ltd.); Resona Sieve and Gyro Shifter (by Tokuju Co., Ltd); Vibrasonic System (by Dalton Co., Ltd.); Soniclean (by Sintokogio, Ltd.); Turbo Screener (by Turbo Kogyo Ltd.); Micro Shifter (by Makino Sangyo Ltd.); and circular vibration sieves.

External Addition Step

The toner preferably contains an external additive. The flowability, charging performance and blocking properties of the toner are improved when the toner contains an external additive. The external addition step is not particularly limited, provided that the external additive can be caused to adhered to the surface of the toner particle. For instance the external additive and the toner particle can be placed in a mixing device such as an FM mixer (by Nippon Coke & Engineering Co., Ltd.), and be sufficiently mixed therein.

A conventionally known external additive can be used, without particular limitations, as the external additive.

Examples of the external additive include starting silica fine particles such as wet-produced silica or dry-produced silica, or surface-treated silica fine particles resulting from subjecting the foregoing starting silica fine particles to a surface treatment using a treating agent such as a silane coupling agent, a titanium coupling agent or silicone oil; metal oxide fine particles typified by titanium oxide fine particles, aluminum oxide fine particles, zinc oxide fine particles, tin oxide fine particles, and metal oxide fine particles having undergone a hydrophobic treatment; metal salts of fatty acid, typified by zinc stearate, calcium stearate and zinc stearate; metal complexes of aromatic carboxylic acids, typified by salicylic acid, alkyl salicylic acid, dialkyl salicylic acid, naphthoic acid and dicarboxylic acids; clay minerals typified by hydrotalcite; fluorine-based resin fine particles typified by vinylidene fluoride fine particles and polytetrafluoroethylene fine particles; inorganic fine particles such as calcium carbonate, calcium phosphate and cerium oxide; as well as organic fine particles of polymethyl methacrylate resin, silicone resins and melamine resin.

Among the foregoing there are preferably used surface-treated silica fine particles having been treated with silicone oil. Silicone oil elicits a pronounced effect of reducing frictional forces, and hence, by virtue of the fact that the silicone oil is present on the surface of the toner external additive, it becomes possible to suppress melt adhesion of toner to a photosensitive drum (hereafter also referred to as fusion of the toner to a drum), which becomes noticeable at the time of continued use in high-temperature, high-humidity environments. Fusion of the toner to the drum occurs mainly on account of pressure at a contact portion between the photosensitive drum and a cleaning blade. Therefore, the above effect is readily achieved in particular in a case where a resin that is deformed easily by external forces, such as the styrene-acrylic resin of the present disclosure, is used as the binder resin. Also, the silicone oil-treated silica is present on the image surface after fixing; as a result, frictional forces on the image surface are reduced, and scratch resistance is improved.

Conventionally known silicone oils can be used as the silicone oil, without particular limitations. Examples include for instance dimethyl silicone oil, methylphenyl silicone oil and methylhydrogen silicone oil.

The viscosity of the silicone oil is preferably from 10 cs to 500 cs.

The content of the external additive is preferably from 0.1 parts by mass to 5.0 parts by mass, relative to 100.0 parts by mass of the toner particle.

Methods for measuring various physical property values of the toner according to the present disclosure will be explained next.

Method for Calculating SP Values

The method proposed by Fedors is adhered to herein. The evaporation energy (Δei) (cal/mol) and molar volume (Δvi) ($cm^3$/mol) of atoms or atomic groups in a molecular structure are determined on the basis of the tables given in "Polym. Eng. Sci., 14 (2), 147-154 (1974)". Here $(4.184\times\Sigma\Delta ei/\Sigma\Delta vi)^{1/2}$ is taken as the SP value $(J/cm^3)^{1/2}$. Further, SPb is calculated from the composition of the monomer units of the styrene-acrylic resin. In turn, SPm is calculated on the basis of the morphology after reaction of the surface treatment agent with the surface of the magnetic body. Further, SPw is calculated from the acid and alcohol constitution of the ester compound.

Method for Separating Binder Resin and the Ester Compound from the Toner

The toner is dissolved in tetrahydrofuran (THF), and then the solvent is distilled off, under reduced pressure, from the obtained soluble fraction, to yield a tetrahydrofuran (THF)-soluble fraction of the toner. The obtained tetrahydrofuran (THF)-soluble fraction of the toner is dissolved in chloroform, to prepare a sample solution having a concentration of 25 mg/mL. Then 3.5 ml of the obtained sample solution are injected into the apparatus below; whereupon a low-molecular weight component having a molecular weight of less than 2000 is sorted as the ester compound, and a high-molecular weight component having a molecular weight of 2000 or more is sorted as a binder resin, under the conditions below.

Preparative GPC device: preparative HPLC (product name: LC-980 model, by Japan Analytical Industry Co., Ltd.)

Preparative columns: JAIGEL 3H, and JAIGEL 5H (by Japan Analytical Industry Co., Ltd.)

Eluent: chloroform

Flow rate: 3.5 mL/min

After fraction sorting, the solvent is distilled off under reduced pressure, with further drying in an atmosphere at 90° C. under reduced pressure, for 24 hours.

Separation of a Toner Particle from Toner

Measurements can be performed, as needed, using a toner particle obtained by removing the external additive from the toner, in accordance with the method below.

Herein 160 g of sucrose (by Kishida Chemical Co. Ltd.) are added to 100 mL of ion-exchanged water and are dissolved therein, while being warmed in a hot water bath, to prepare a sucrose concentrate. Then 31 g of this sucrose concentrate and 6 mL of Contaminon N (10 mass % aqueous solution of a pH-7 neutral detergent for cleaning of precision measuring instruments, made up of a nonionic surfactant, an anionic surfactant and an organic builder, by Wako Pure Chemical Industries, Ltd.) are introduced into a centrifuge tube (50 mL volume). Then 1.0 g of toner is added thereto, and toner clumps are broken up using a spatula or the like. The centrifuge tube is shaken in a shaker (AS-1 N, sold by AS ONE Corporation) for 20 minutes at 300 spm (strokes per minute). After shaking, the solution is transferred to a glass tube (50 mL volume) for swing rotors, and is centrifuged under conditions of 3500 rpm for 30 minutes, using a centrifuge (H-9R, by Kokusan Co. Ltd.).

As a result of this operation the toner particle becomes separated from the external additive. Sufficient separation of the toner particle and the aqueous solution is checked visually, and the toner particle separated into the uppermost layer is retrieved using a spatula or the like. The retrieved toner particle is filtered through a vacuum filter and is then dried for 1 hour or longer in a dryer, to yield a measurement sample. This operation is carried out a plurality of times to secure a required amount.

Measurement of the Molecular Weight of the Ester Compound by Mass Spectrometry

Separation of the Ester Compound from the Toner

The molecular weight of the ester compound can be measured with the toner as-is, but is more preferably measured after a separation operation. A method for separating the binder resin and the ester compound from the toner may be adopted as the separation operation; alternatively a method such as the following one may be resorted to.

The toner is dispersed in ethanol, which is a poor solvent of toner, and the temperature is raised to a temperature above the melting point of the ester compound. At this time the toner dispersion may be pressurized, as needed. As a result of this operation the ester compound that exceeds the melting point melts, and is extracted in ethanol. When pressure is applied, in addition to heating, the ester compound can be separated from the toner by solid-liquid separation while under application of pressure.

The extract is next dried and solidified, to yield an ester compound. The ester compound can be identified, and the molecular weight thereof measured, by pyrolysis GCMS, using the equipment and under the measurement conditions given below.

Identification of the Ester Compound, and Measurement of the Molecular Weight Thereof, by Pyrolysis GCMS Mass spectrometer: ISQ by Thermo Fisher Scientific GC device: Focus GC by Thermo Fisher Scientific.

Ion source temperature: 250° C.

Ionization method: EI

Mass range: 50-1000 m/z

Column: HP-5MS (30 m)

Pyrolysis device: JPS-700 by Japan Analytical Industry Co., Ltd.

A small amount of the ester compound separated as a result of the extraction operation and 1 μL of tetramethylammonium hydroxide (TMAH) are added to a pyrofoil at 590° C. A pyrolysis GCMS measurement is then performed on the produced sample, under the above conditions, to obtain respective peaks of the alcohol component and the carboxylic acid component derived from the ester compound. The alcohol component and the carboxylic acid component are detected in the form of methylated products resulting from the action of TMAH, which is a methylating agent. The molecular weight can then be determined by analyzing the obtained peaks and identifying the structure of the ester compound.

For instance the following equipment and measurement conditions can be resorted to in a case where the ester compound is to be identified and the molecular weight thereof is measured by direct insertion.

Identification of the Ester Compound, and Measurement of the Molecular Weight Thereof, by Direct Insertion Mass spectrometer: ISQ by Thermo Fisher Scientific Ion source temperature: 250° C.; Electron energy: 70 eV Mass range: 50-1000 m/z (CI)

Reagent Gas: methane (CI)

Ionization method: Direct Exposure Probe DEP, by Thermo Fisher Scientific, 0 mA (10 sec)-10 mA/sec-1000 mA (10 sec)

The ester compound separated as a result of the extraction operation is directly placed on a filament portion of the DEP unit, and is measured. The molecular ions in the mass spectrum of the main component peak in the obtained chromatogram, around 0.5 to 1 minute, are ascertained, to identify the ester compound and determine the molecular weight thereof Method for Measuring the Glass Transition Temperature (Tg) of the Binder Resin The glass transition temperature (Tg) of the binder resin is measured according to ASTM D3418-82 using a differential scanning calorimeter (product name: Q1000, by TA Instruments Inc.). The temperature at the detection unit of the instrument is corrected on the basis of the melting points of indium and zinc, and the amount of heat is corrected on the basis of the heat of fusion of indium.

Specifically, 5 mg of binder resin are weighed exactly, and are placed on a pan made of aluminum; a measurement is then carried out at a ramp rate of 1° C./min within a measurement range of 30 to 200° C., using an empty aluminum-made pan as a reference. In this temperature raising process there is obtained a specific heat change within a temperature range of 40° C. to 100° C. The intersection between a differential heat curve and a midpoint line of a baseline before and after a change in specific heat is taken herein as the glass transition temperature (Tg) of the binder resin.

Composition Analysis of the Binder Resin

Method for Separating the Binder Resin

The molecular weight of the binder resin can be measured with the toner as-is, but is more preferably measured after a separation operation. A method for separating the binder resin and the ester compound from the toner may be adopted as the separation operation; alternatively a method such as the following one may be resorted to.

Herein 100 mg of toner are dissolved in 3 mL of chloroform. Next, the insoluble fraction is removed by suction filtration using a syringe fitted with a sample processing filter (pore size from 0.2 μm to 0.5 for instance MYSYORI DISC H-25-2 (by Tosoh Corporation). The soluble fraction is introduced into a preparative HPLC (device: LC-9130 NEXT, preparative column (60 cm), exclusion limit: 20000, 70000; two connected columns), by Nippon Analytical Industry Co., Ltd., and a chloroform eluent is fed. Once a peak can be discerned on the obtained chromatograph, a fraction is sorted at the retention time at which a molecular weight of 2000 or higher is separated for a monodisperse polystyrene standard sample. A solution of the obtained fraction is dried and solidified, to yield a binder resin.

Measurement of Composition Ratios and Ratios by Weight, and Identification of $C_B$, by Nuclear Magnetic Resonance Spectroscopy (NMR)

Herein 1 mL of deuterated chloroform is added to 20 mg of the binder resin obtained above, and an NMR spectrum of the protons of the dissolved binder resin is measured. The molar ratio and ratio by weight of the monomers can be calculated, and the content of units derived from styrene can be worked out, on the basis of the obtained NMR spectrum. In the case for instance of a styrene-acrylic copolymer, the composition ratio and the ratio by weight are calculated on the basis of a peak in the vicinity of 6.5 ppm, derived from a styrene monomer, and a peak in the vicinity of 3.5-4.0 ppm, derived from an acrylic monomer. In a case for instance where the toner contains a binder resin in the form of an ordinarily known polyester resin, the molar ratio and the ratio by weight can be calculated also including peaks derived from the styrene-acrylic copolymer, along with the peaks derived from the monomers that make up the polyester resin, to work out the content of units derived from styrene.

Further, $C_B$ is worked out through identification of the monomer units represented by Formula (1) in the styrene-acrylic resin, on the basis of the obtained NMR spectrum.

The following devices and measurement conditions can be resorted to in nuclear magnetic resonance spectroscopy (NMR).

NMR device: RESONANCE ECX500 by JEOL Ltd.

Observation nucleus: protons

Measurement mode: single pulse

Identification of $C_M$

Herein 10 mL of chloroform are added to 100 mg of toner, and the whole is treated in a homogenizer for 10 minutes, to dissolve the binder resin. The magnetic body is thereafter recovered using a magnet. The magnetic body is isolated by repeating this operation several times.

The obtained magnetic body is subjected to pyrolysis GCMS under the conditions below. A pyrolyzed product of the compound having an alkyl group that is present on the magnetic body surface is obtained in the measurement; accordingly, $C_M$ is worked out through analysis of peaks derived from the main component of the pyrolyzed product, and through identification of the structure of the alkyl groups. The pyrolyzed product is detected in the form of an alkyl substitution product of the compound having an alkyl group that is present on the surface of the magnetic body, or in the form of a double bond-modified product, an alkylsilane, or the like of the alkyl substitution product.

Mass spectrometer: ISQ by Thermo Fisher Scientific

GC device: Focus GC by Thermo Fisher Scientific

Ion source temperature: 250° C.

Ionization method: EI

Mass range: 50-1000 m/z

Column: HP-5MS (30 m)

Pyrolysis device: JPS-700 by Japan Analytical Industry Co., Ltd.

Method for Measuring the Average Circularity of Toner

The average circularity of toner and a toner particle is measured and analyzed under the conditions below using a flow particle image analyzer (product name: FPIA-3000, by Sysmex Corporation).

The concrete measurement method is as follows.

Firstly, about 20 mL of ion-exchanged water having had solid impurities and so forth removed therefrom beforehand are placed in a glass vessel. Then about 0.2 mL of a dilution containing a dispersing agent in the form of "Contaminon N" (10 mass % aqueous solution of a pH 7 neutral detergent for cleaning of precision instruments, containing a nonionic surfactant, an anionic surfactant and an organic builder, produced by Wako Pure Chemical Industries, Ltd.) diluted thrice by mass in ion-exchanged water, is added to the glass vessel.

Further, about 0.02 g of the measurement sample are added and are dispersed for 2 minutes using an ultrasonic disperser, to prepare a dispersion for measurement. The dispersion is cooled as appropriate down to a temperature from 10° C. to 40° C. The ultrasonic disperser that is used is a desktop ultrasonic cleaner/disperser (for instance VS-150 (by Velvo-Clear Co.)) having an oscillation frequency of 50 kHz and an electrical output of 150 W; herein, a given amount of ion-exchanged water is placed in the water tank, and about 2 mL of the above Contaminon N are added into the water tank.

In the measurement there was used a flow particle image analyzer fitted with "UPlanApo" (10 magnifications; numerical aperture 0.40), as an objective lens. Particle sheath "PSE-900A" (by Sysmex Corporation) was used as a sheath solution. A dispersion prepared according to the above procedure is introduced to the flow particle image analyzer, and 3000 toner particles are measured according to a total count mode, in a HPF measurement mode. The average circularity of the aggregated particles is then worked out with a binarization threshold at the time of particle analysis set to 85%, and with the analyzed particle diameter limited to a circle-equivalent diameter in the range from 1.985 μm to less than 39.69 μm.

In the measurement, automatic focus adjustment is performed before the start of the measurement, using standard latex particles (dilution of "RESEARCH AND TEST PARTICLES Latex Microsphere Suspensions 5200A", by Duke Scientific Corporation, in ion-exchanged water).

Method for Calculating the Occupied Area Ratio of the Magnetic Body in the Toner, and the Coefficient of Variation (CV) of the Occupied Area Ratio The occupied area ratio of the magnetic body in the toner and the coefficient of variation (CV) of the occupied area ratio are calculated as follows.

Firstly, an image of a cross section of the toner is acquired using a transmission electron microscope (TEM). The obtained cross-sectional image is used to obtain a frequency histogram of the occupied area ratio of the magnetic body in each section grid, on the basis of a partitioning method. Further, the coefficient of variation of an occupied area ratio of each obtained section grid is worked out, and is taken as the coefficient of variation of the occupied area ratio.

Specifically, firstly the magnetic toner is compression-shaped to form a tablet. The tablet is obtained by filling a tablet forming device having a diameter of 8 mm, with 100 mg of magnetic toner, and allowing the magnetic toner to stand for 1 minute while under application of a 35 kN force. The obtained tablet is cut using an ultrasonic ultramicrotome (UC7, by Leica Microsystems GmbH), to obtain a flaky sample having a film thickness of 250 nm. Then a STEM image of the obtained flaky sample is captured using a transmission electron microscope (JEM2800, by JEOL Ltd.). The probe size used for capturing the STEM image is set to 1.0 nm, and the image size is set to 1024×1024 pixels. At this time it becomes possible to darkly capture a magnetic body portion by setting Contrast to 1425 and setting Brightness to 3750, in the bright-field Detector Control panel, and by setting Contrast to 0.0, Brightness to 0.5 and Gamma to 1.00 in the Image Control panel. The above settings allow obtaining a STEM image suitable for image processing. The obtained STEM image is quantified using an image processing device (LUZEX AP by Nireco Corporation). Specifically, a frequency histogram of the occupied area ratio of the magnetic body in a grid of 0.8 μm-side squares is obtained in accordance with a partitioning method. The class interval of the histogram is set herein to 5%. The coefficient of variation (CV) is worked out from the occupied area ratio obtained for each section grid, and on the basis of the average value of the occupied area ratio. The average value of the occupied area ratio is the average of the occupied area ratios of the respective section grids.

Method for Calculating the Number-Average Particle Diameter, and Standard Deviation Thereof, of the Magnetic Body in the Toner The number-average particle diameter, and standard deviation thereof, of the magnetic body in the toner, are calculated as follows.

The magnetic body obtained in accordance with the above isolation method is heated at 800° C. for 30 minutes, using an electric furnace, to break up the residual organic component. The remaining magnetic body is recovered, and is then observed using scanning electron microscope (SEM) and analyzed using an energy dispersive X-ray analyzer (EDX). In an observation at 10000 observation magnifications it is ascertained, by EDX analysis, that the particles are made up of iron and oxygen (including trace elements such as trace amounts of Si, as needed), and the major axis of the particles is worked out using image processing software. Herein 200 particles are measured, the number-average particle diameter is calculated from the average value, and also the standard deviation is worked out.

SEM: JSM7800 by JEOL Ltd.; EDX: Talos F200X by Thermo Fisher Scientific Image processing software: image analysis device (Luzex AP by Nireco Corporation)

Measurement of the Thermal Conductivity of the Toner (1) Preparation of a Measurement Sample There are prepared two cylindrical measurement samples having a diameter of 25 mm and a height of 6 mm, by compression molding of about 5 g of toner (amount variable, depending on the specific gravity of the sample), at 20 MPa, using a tablet molding compressor, in an environment of 25° C. for 60 seconds.

(2) Measurement of Thermal Conductivity

Measuring device: thermal property measuring device TPS2500 S based on the hot-disk method Sample holder: sample holder for room temperature Sensor: standard accessory (RTK) sensor Software: hot-disk analysis 7

One of the measurement samples is placed on a mounting table stand of the sample holder for room temperature, and the height of the table is adjusted so that the surface of the measurement sample is at the same height as that of the sensor. The second measurement sample and also an attached metal piece are placed on the sensor, and pressure is applied using a sensor-top screw. The pressure is adjusted to 10 cN·m using a torque wrench. It is checked that the centers of the measurement sample and the sensor lie directly below the screw.

Hot disk analysis is launched, and Bulk (Type I) is selected as the experiment type.

Input items are introduced as follows.

Available probing depth: 6 mm

Measurement time: 40 s

Heating power: 60 mW

Sample temperature: 23° C.

TCR: 0.004679K−1

Sensor type: Disk

Sensor material type: Kapton

Sensor design: 5465

Sensor Radius: 3.189 mm

The measurement is initiated after the above inputs. Once the measurement is complete, the Calculate button is selected, Start Point: 10 and End Point: 200 are inputted, the Standard Analysis button is selected, and Thermal Conductivity (W/mK) is calculated.

EXAMPLES

The toner of the present disclosure will be explained in detail hereafter on the basis of examples and comparative examples, but the present invention is not meant to be limited to these examples. Unless particularly noted otherwise, the language "parts" in the disclosure of the examples below refers to mass basis.

Production Example of Binder Resin A1

| | |
|---|---|
| Styrene | 81.00 parts |
| n-butyl acrylate | 13.00 parts |
| n-lauryl acrylate | 6.00 parts |

The above materials were uniformly dispersed and mixed using an attritor (by Nippon Coke & Engineering Co., Ltd).

The obtained monomer composition was heated at a temperature of 60° C., and the materials below were further mixed in and dissolved, to yield a polymerizable monomer composition.

Polymerization Initiator 10.00 Parts (t-butyl Peroxypivalate (25% Toluene Solution))

Meanwhile, 450 parts of a 0.1 mol/L-$Na_3PO_4$ aqueous solution were added to 720 parts of ion-exchanged water, and the whole was heated at a temperature of 60° C., followed by addition of 67.7 parts of a 1.0 mol/L-$CaCl_2$) aqueous solution, to yield an aqueous solution that contained a dispersion stabilizer.

The polymerizable monomer composition was added to the aqueous medium thus obtained, with stirring at 200 $s^{-1}$ for 15 minutes using a TK-model homomixer (by PRIMIX Corporation) at a temperature of 60° C. in a nitrogen atmosphere. A polymerization reaction was carried out thereafter for 300 minutes at a reaction temperature of 70° C., with stirring using a paddle stirring blade.

The obtained suspension was thereafter cooled down to room temperature at 3° C. per minute, hydrochloric acid was added to dissolve the dispersing agent, and the suspension was then filtered, washed with water and dried, to yield Binder resin A1.

Production Examples of Binder Resins A2 to A13

Binder resins A2 to A13 were obtained in the same way as in the production example of Binder resin A1, but herein the monomer formulation was modified to those given in Table 1.

TABLE 1

| | St | n-BA | LA | LMA | n-DA | MA | PDA | PA | n-OA | AA | SP value $(J/cm^3)^{1/2}$ | Tg (° C.) | Carbon number $C_B$ |
|---|---|---|---|---|---|---|---|---|---|---|---|---|---|
| Binder resin A1 | 81.0 | 13.0 | 6.0 | 0.0 | 0.0 | 0.0 | 0.0 | 0.0 | 0.0 | 0.0 | 20.00 | 56 | 12 |
| Binder resin A2 | 82.0 | 9.0 | 9.0 | 0.0 | 0.0 | 0.0 | 0.0 | 0.0 | 0.0 | 0.0 | 19.97 | 56 | 12 |
| Binder resin A3 | 80.0 | 17.0 | 3.0 | 0.0 | 0.0 | 0.0 | 0.0 | 0.0 | 0.0 | 0.0 | 20.04 | 56 | 12 |
| Binder resin A4 | 85.0 | 0.0 | 15.0 | 0.0 | 0.0 | 0.0 | 0.0 | 0.0 | 0.0 | 0.0 | 19.90 | 56 | 12 |
| Binder resin A5 | 78.5 | 20.5 | 1.0 | 0.0 | 0.0 | 0.0 | 0.0 | 0.0 | 0.0 | 0.0 | 20.07 | 56 | 12 |
| Binder resin A6 | 81.0 | 13.0 | 0.0 | 6.0 | 0.0 | 0.0 | 0.0 | 0.0 | 0.0 | 0.0 | 19.99 | 56 | 12 |
| Binder resin A7 | 81.0 | 13.0 | 0.0 | 0.0 | 6.0 | 0.0 | 0.0 | 0.0 | 0.0 | 0.0 | 20.02 | 56 | 10 |
| Binder resin A8 | 81.0 | 13.0 | 0.0 | 0.0 | 0.0 | 6.0 | 0.0 | 0.0 | 0.0 | 0.0 | 20.00 | 56 | 14 |
| Binder resin A9 | 81.0 | 13.0 | 0.0 | 0.0 | 0.0 | 0.0 | 6.0 | 0.0 | 0.0 | 0.0 | 19.99 | 57 | 15 |
| Binder resin A10 | 80.0 | 0.0 | 20.0 | 0.0 | 0.0 | 0.0 | 0.0 | 0.0 | 0.0 | 0.0 | 19.83 | 52 | 12 |
| Binder resin A11 | 81.0 | 13.0 | 0.0 | 0.0 | 0.0 | 0.0 | 0.0 | 6.0 | 0.0 | 0.0 | 19.99 | 57 | 16 |
| Binder resin A12 | 81.0 | 13.0 | 0.0 | 0.0 | 0.0 | 0.0 | 0.0 | 0.0 | 6.0 | 0.0 | 20.03 | 56 | 8 |
| Binder resin A13 | 81.0 | 13.0 | 0.0 | 0.0 | 0.0 | 0.0 | 0.0 | 0.0 | 0.0 | 6.0 | 20.48 | 56 | — |

In the notation of Table 1, St denotes styrene, n-BA denotes n-butyl acrylate, LA denotes lauryl acrylate, LMA denotes lauryl methacrylate, n-DA denotes n-decyl acrylate, MA denotes myristyl acrylate, PDA denotes pentadecyl acrylate, PA denotes palmityl acrylate, n-OA denotes n-octyl acrylate and AA denotes acrylic acid, and the numerical values of compounds represent the number of parts of the respective monomers.

Production Example of Magnetic Body B1

Into an aqueous solution of ferrous sulfate there was mixed a caustic soda solution (containing 1 mass % of sodium hexametaphosphate on a P basis referred to Fe), in an amount of 1.0 equivalent of iron ions, to prepare an aqueous solution containing ferrous hydroxide. Air was blown into the aqueous solution while the pH thereof was maintained at 9, and an oxidation reaction was conducted at 75° C. until ferrous hydroxide was completely consumed, to prepare a slurry for producing seed crystals.

Next, an aqueous solution of ferrous sulfate was added to the slurry, in an amount of 1.0 equivalent with respect to the initial alkali amount (sodium component of caustic soda). The slurry was maintained at pH 8, air was blown in, and the oxidation reaction was caused to proceed at 75° C. until ferrous sulfate was completely consumed; at the later stage of the oxidation reaction the pH was adjusted to 6, and the slurry was washed with water and was dried, to yield spherical magnetite particles as a magnetic iron oxide having a number-average particle diameter of primary particles of 200 nm, and a standard deviation of 72 nm of the number-average particle diameter.

Then 10.0 kg of the obtained magnetic iron oxide were placed in a Simpson Mix-Muller (model MSG-0 L by Shin-Nitto Kogyo Ltd.), with deagglomeration for 30 minutes.

Thereafter, 95 g of n-decyltrimethoxysilane as a silane coupling agent were added into the apparatus, and the apparatus was operated for 1 hour, to treat the particle surface of the magnetic iron oxide with the silane coupling agent; Magnetic body B1 was obtained as a result.

Production Examples of Magnetic Bodies B2 to B6 and B9

Magnetic bodies B2 to B6 and B9 were produced in the same way as in the production Example of Magnetic Body B1, but herein the type of the surface treatment agent was modified as given in Table 2.

TABLE 2

| | Surface treatment device | Hydrophobizing agent | Carbon number $C_M$ | Number-average primary particle diameter (nm) | Standard deviation (nm) of number-average primary particle diameter | SP value $(J/cm^3)^{1/2}$ |
|---|---|---|---|---|---|---|
| Magnetic body B1 | Mix-Muller | n-decyltrimethoxysilane | 10 | 200 | 72 | 18.16 |
| Magnetic body B2 | Mix-Muller | n-butyltrimethoxysilane | 4 | 200 | 72 | 18.79 |
| Magnetic body B3 | Mix-Muller | n-hexyltrimethoxysilane | 6 | 200 | 72 | 18.46 |
| Magnetic body B4 | Mix-Muller | n-hexyldecyltrimethoxysilane | 16 | 200 | 72 | 17.93 |
| Magnetic body B5 | Mix-Muller | n-dodecyltrimethoxysilane | 12 | 200 | 72 | 18.06 |
| Magnetic body B6 | Henschel mixer | Alkyl-modified silicone oil | 18 | 200 | 72 | 17.03 |
| Magnetic body B7 | Mix-Muller | n-decyltrimethoxysilane | 10 | 205 | 54 | 18.16 |
| Magnetic body B8 | Mix-Muller | n-methyltrimethoxysilane | 1 | 200 | 72 | 17.89 |
| Magnetic body B9 | — | No treatment | — | 200 | 72 | — |

In the table, the carbon number $C_M$ denotes the value worked out, for the reaction magnetic body, in accordance with the above method for identifying the alkyl group on the surface of the magnetic body.

Production Example of Magnetic Body B7

Magnetic body B7 was obtained in the same way as in the production Example of Magnetic Body B1, but herein the temperature in the production Example of Magnetic Body B1 was modified to 85° C.

Production Example of Magnetic Body B8

Magnetic body B8 was obtained in the same way as in production Example of Magnetic Body B1, but herein a Henschel mixer (model FM-10, by Nippon Coke & Engineering Co., Ltd.) was used instead of Simpson Mix-Muller, as the apparatus in a deagglomeration treatment and a hydrophobic treatment, and an alkyl-modified silicone oil was used instead of an alkylalkoxysilane, as the surface treatment agent.

Production Example of Toner 1

Production Example of Toner in Accordance with a Pulverization Method

| | |
|---|---|
| Binder resin A1 | 100.0 parts |
| Magnetic body B1 | 65.0 parts |
| Ester compound (ethylene glycol distearate) | 5.0 parts |
| Hydrocarbon wax (Fischer-Tropsch wax; melting point 77° C.) | 5.0 parts |
| Charge control agent (T-77: by Hodogaya Chemical Co., Ltd.) | 1.0 part |

The above materials were pre-mixed in an FM mixer (by Nippon Coke & Engineering Co., Ltd.), and thereafter were kneaded using a twin-screw kneading extruder (PCM-30 model, by Ikegai Corp.), with rotational speed set to 3.33 $s^{-1}$, and with the set temperature regulated so that the temperature the kneaded product in the vicinity of a kneaded product outlet was 120° C.

The obtained kneaded product was cooled, was coarsely pulverized using a hammer mill, and was then pulverized in a mechanical pulverizing machine (T-250, by Turbo Kogyo Co., Ltd.), and the obtained finely pulverized powder was classified using a multi-grade classifier relying on the Coanda effect. Thereafter surface modification was performed using Faculty F-300 (by Hosokawa Micron Corporation). The operating conditions included 130 $s^{-1}$ as the rotational speed of the classification rotor and 120 $s^{-1}$ as the rotational speed of the dispersion rotor. A toner particle having a weight-average particle diameter (D4) of 8.0 μm and a circularity of 0.943 was obtained as a result.

Then 1.2 parts of hydrophobized silica fine particles (resulting from a hydrophobic treatment of 100 parts of silica fine particles having a BET specific surface area of 150 $m^2/g$ with 30 parts (100CS) of dimethyl silicone oil) were externally added to, and mixed with, 100 parts of the above toner particle, using FM mixer (FM-75 model, by Nippon Coke & Engineering Co., Ltd.), and the resulting mixture was sifted with a sieve having an 150 μm opening mesh, to yield Toner 1. Table 4 sets out the physical properties of the toner.

Production Examples of Toners 2 to 5, 8 to 20, 23, 25 to 28 and 35

Toners were produced in the same way as in production example of Toner 1, but herein the formulation was modified as given in Table 3.

Toners 2 to 5, 8 to 20, 23, 25 to 28 and 35 were thus obtained. Table 4 sets out the physical properties of the toners.

Production Examples of Toners 6 and 7

Toners 6 and 7 were produced in the same way as in the production example of Toner 1, but herein the rotational speed of the twin-screw kneading extruder was set to 2.5 $s^{-1}$, the set temperature was regulated so that the temperature the kneaded product in the vicinity of the kneaded product outlet was 150° C., and the formulation was modified as given in Table 3. Table 4 sets out the physical properties of the toners.

Production Example of Toner 21

Toner 21 was obtained in the same way as in production example of Toner 1, but herein the surface modification treatment was not carried out. Table 4 sets out the physical properties of the toner.

Production Example of Toner 24

Toner 24 was obtained in the same way as in the production example of Toner 1, but herein the external additive was modified to hydrophobized silica fine particles (resulting from a hydrophobic treatment of 100 parts of silica fine particles having a BET specific surface area of 150 $m^2/g$ with 20 parts of HMDS hexamethyldisilazane). Table 4 sets out the physical properties of the toner.

Production Examples of Toners 29 to 34

Toners 29 to 34 were obtained in the same way as in the production example of Toner 1, but herein the surface modification treatment was not carried out, the external additive was modified to hydrophobized silica fine particles (resulting from a hydrophobic treatment of 100 parts of silica fine particles having a BET specific surface area of 150 $m^2/g$ with 20 parts of HMDS hexamethyldisilazane), and the formulation was modified as given in Table 3. Table 4 sets out the physical properties of the toners.

TABLE 3

| | Binder resin A | | Magnetic body B | | Ester compound | | | |
|---|---|---|---|---|---|---|---|---|
| | | Number of parts | | Number of parts | | Structure | SP value $(J/cm^3)^{1/2}$ | Number of parts |
| Toner 1 | A1 | 100 | B1 | 65 | Ethylene glycol distearate | Formula (6) | 18.11 | 5 |
| Toner 2 | A2 | 100 | B1 | 65 | Ethylene glycol distearate | Formula (6) | 18.11 | 5 |
| Toner 3 | A3 | 100 | B1 | 65 | Ethylene glycol distearate | Formula (6) | 18.11 | 5 |
| Toner 4 | A1 | 100 | B1 | 115 | Ethylene glycol distearate | Formula (6) | 18.11 | 5 |
| Toner 5 | A1 | 100 | B1 | 45 | Ethylene glycol distearate | Formula (6) | 18.11 | 5 |
| Toner 6 | A1 | 100 | B1 | 95 | Ethylene glycol distearate | Formula (6) | 18.11 | 5 |
| Toner 7 | A1 | 100 | B1 | 65 | Ethylene glycol distearate | Formula (6) | 18.11 | 5 |
| Toner 8 | A1 | 100 | B2 | 65 | Ethylene glycol distearate | Formula (6) | 18.11 | 5 |
| Toner 9 | A1 | 100 | B3 | 65 | Ethylene glycol distearate | Formula (6) | 18.11 | 5 |
| Toner 10 | A1 | 100 | B4 | 65 | Ethylene glycol distearate | Formula (6) | 18.11 | 5 |
| Toner 11 | A1 | 100 | B5 | 100 | Ethylene glycol distearate | Formula (6) | 18.11 | 5 |

TABLE 3-continued

| | Binder resin A | | Magnetic body B | | Ester compound | | | |
|---|---|---|---|---|---|---|---|---|
| | | Number of parts | | Number of parts | | Structure | SP value $(J/cm^3)^{1/2}$ | Number of parts |
| Toner 12 | A4 | 100 | B1 | 65 | Ethylene glycol distearate | Formula (6) | 18.11 | 5 |
| Toner 13 | A5 | 100 | B1 | 65 | Ethylene glycol distearate | Formula (6) | 18.11 | 5 |
| Toner 14 | A6 | 100 | B1 | 65 | Ethylene glycol distearate | Formula (6) | 18.11 | 5 |
| Toner 15 | A7 | 100 | B5 | 65 | Ethylene glycol distearate | Formula (6) | 18.11 | 5 |
| Toner 16 | A7 | 100 | B2 | 65 | Ethylene glycol distearate | Formula (6) | 18.11 | 5 |
| Toner 17 | A8 | 100 | B5 | 65 | Ethylene glycol distearate | Formula (6) | 18.11 | 5 |
| Toner 18 | A8 | 100 | B2 | 65 | Ethylene glycol distearate | Formula (6) | 18.11 | 5 |
| Toner 19 | A9 | 100 | B3 | 65 | Ethylene glycol distearate | Formula (6) | 18.11 | 5 |
| Toner 20 | A10 | 100 | B1 | 65 | Ethylene glycol distearate | Formula (6) | 18.11 | 5 |
| Toner 21 | A1 | 100 | B1 | 65 | Ethylene glycol distearate | Formula (6) | 18.11 | 5 |
| Toner 22 | A1 | 100 | B1 | 65 | Ethylene glycol distearate | Formula (6) | 18.11 | 5 |
| Toner 23 | A1 | 100 | B6 | 65 | Ethylene glycol distearate | Formula (6) | 18.11 | 5 |
| Toner 24 | A1 | 100 | B1 | 65 | Ethylene glycol distearate | Formula (6) | 18.11 | 5 |
| Toner 25 | A1 | 100 | B1 | 65 | Dibehenyl sebacate | Formula (7) | 17.94 | 5 |
| Toner 26 | A1 | 100 | B1 | 65 | Behenyl behenate | Formula (8) | 17.56 | 5 |
| Toner 27 | A1 | 100 | B7 | 65 | Behenyl behenate | Formula (8) | 17.56 | 5 |
| Toner 28 | A1 | 100 | B1 | 65 | — | — | — | — |
| Toner 29 | A11 | 100 | B5 | 65 | — | — | — | — |
| Toner 30 | A12 | 100 | B5 | 65 | — | — | — | — |
| Toner 31 | A1 | 100 | B8 | 65 | — | — | — | — |
| Toner 32 | A1 | 100 | B9 | 65 | — | — | — | — |
| Toner 33 | A9 | 100 | B2 | 65 | — | — | — | — |
| Toner 34 | A13 | 100 | B1 | 65 | Behenyl behenate | Formula (8) | 17.56 | 5 |
| Toner 35 | A1 | 100 | B1 | 65 | Ethylene glycol distearate | Formula (6) | 18.11 | 5 |

TABLE 4

| | SPb | SPm | SPw | \|SPb − SPm\| | \|SPm − SPw\| | \|SPb − SPw\| | $C_B$ | $C_M$ | $\|C_B - C_M\|$ | Average Circularity | Average (%) of occupied area ratio of magnetic body | CV | Thermal conductivity |
|---|---|---|---|---|---|---|---|---|---|---|---|---|---|
| Toner 1 | 20.00 | 18.16 | 18.11 | 1.84 | 0.05 | 1.89 | 12 | 10 | 2 | 0.943 | 30.4 | 25.0 | 0.210 |
| Toner 2 | 19.97 | 18.16 | 18.11 | 1.81 | 0.05 | 1.86 | 12 | 10 | 2 | 0.942 | 29.8 | 19.5 | 0.222 |
| Toner 3 | 20.04 | 18.16 | 18.11 | 1.88 | 0.05 | 1.93 | 12 | 10 | 2 | 0.945 | 29.7 | 35.0 | 0.202 |
| Toner 4 | 20.00 | 18.16 | 18.11 | 1.84 | 0.05 | 1.89 | 12 | 10 | 2 | 0.947 | 39.8 | 33.0 | 0.228 |
| Toner 5 | 20.00 | 18.16 | 18.11 | 1.84 | 0.05 | 1.89 | 12 | 10 | 2 | 0.941 | 22.2 | 21.0 | 0.194 |
| Toner 6 | 20.00 | 18.16 | 18.11 | 1.84 | 0.05 | 1.89 | 12 | 10 | 2 | 0.939 | 37.8 | 58.5 | 0.223 |
| Toner 7 | 20.00 | 18.16 | 18.11 | 1.84 | 0.05 | 1.89 | 12 | 10 | 2 | 0.937 | 32.5 | 55.2 | 0.193 |
| Toner 8 | 20.00 | 18.79 | 18.11 | 1.21 | 0.68 | 1.89 | 12 | 4 | 8 | 0.941 | 30.4 | 30.0 | 0.205 |
| Toner 9 | 20.00 | 18.46 | 18.11 | 1.54 | 0.35 | 1.89 | 12 | 6 | 6 | 0.941 | 31 | 28.5 | 0.208 |
| Toner 10 | 20.00 | 17.93 | 18.11 | 2.07 | 0.18 | 1.89 | 12 | 16 | 4 | 0.943 | 30.8 | 27.0 | 0.206 |
| Toner 11 | 20.00 | 18.06 | 18.11 | 1.94 | 0.05 | 1.89 | 12 | 12 | 0 | 0.944 | 31.0 | 22.0 | 0.216 |
| Toner 12 | 19.90 | 18.16 | 18.11 | 1.74 | 0.05 | 1.79 | 12 | 10 | 2 | 0.944 | 29.7 | 19.3 | 0.228 |
| Toner 13 | 20.07 | 18.16 | 18.11 | 1.91 | 0.05 | 1.96 | 12 | 10 | 2 | 0.942 | 30.5 | 37.0 | 0.198 |
| Toner 14 | 19.99 | 18.16 | 18.11 | 1.83 | 0.05 | 1.88 | 12 | 10 | 2 | 0.941 | 28.8 | 27.0 | 0.211 |
| Toner 15 | 20.02 | 18.06 | 18.11 | 1.96 | 0.05 | 1.91 | 10 | 12 | 2 | 0.942 | 30.0 | 26.0 | 0.212 |
| Toner 16 | 20.02 | 18.79 | 18.11 | 1.23 | 0.68 | 1.91 | 10 | 4 | 6 | 0.943 | 28.8 | 27.5 | 0.209 |
| Toner 17 | 19.99 | 18.06 | 18.11 | 1.93 | 0.05 | 1.88 | 14 | 12 | 2 | 0.941 | 31.2 | 25.0 | 0.215 |
| Toner 18 | 19.99 | 18.79 | 18.11 | 1.20 | 0.68 | 1.88 | 14 | 4 | 10 | 0.941 | 30.5 | 30.5 | 0.205 |
| Toner 19 | 19.99 | 18.46 | 18.11 | 1.53 | 0.35 | 1.88 | 15 | 6 | 9 | 0.940 | 30.2 | 29.7 | 0.207 |
| Toner 20 | 19.83 | 18.16 | 18.11 | 1.67 | 0.05 | 1.72 | 12 | 10 | 2 | 0.940 | 31.2 | 19.5 | 0.222 |
| Toner 21 | 20.00 | 18.16 | 18.11 | 1.84 | 0.05 | 1.89 | 12 | 10 | 2 | 0.910 | 29.5 | 24.3 | 0.215 |
| Toner 22 | 20.00 | 18.16 | 18.11 | 1.84 | 0.05 | 1.89 | 12 | 10 | 2 | 0.973 | 15.9 | 68.5 | 0.181 |
| Toner 23 | 20.00 | 17.03 | 18.11 | 2.97 | 1.08 | 1.89 | 12 | 18 | 6 | 0.943 | 30.1 | 39.5 | 0.200 |
| Toner 24 | 20.00 | 18.16 | 18.11 | 1.84 | 0.05 | 1.89 | 12 | 10 | 2 | 0.941 | 31.2 | 25.0 | 0.208 |
| Toner 25 | 20.00 | 18.16 | 17.94 | 1.84 | 0.22 | 2.06 | 12 | 10 | 2 | 0.940 | 30.4 | 26.3 | 0.200 |
| Toner 26 | 20.00 | 18.16 | 17.56 | 1.84 | 0.60 | 2.44 | 12 | 10 | 2 | 0.941 | 29.8 | 27.5 | 0.197 |
| Toner 27 | 20.00 | 18.16 | 17.56 | 1.84 | 0.60 | 2.44 | 12 | 10 | 2 | 0.94 | 29.5 | 22.5 | 0.192 |
| Toner 28 | 20.00 | 18.16 | — | 1.84 | — | — | 12 | 10 | 2 | 0.938 | 29.8 | 27.2 | 0.199 |
| Toner 29 | 19.99 | 18.06 | — | 1.93 | — | — | 16 | 12 | 4 | 0.911 | 32.0 | 32.0 | 0.198 |
| Toner 30 | 20.03 | 18.06 | — | 1.97 | — | — | 8 | 12 | 4 | 0.911 | 30.7 | 29.5 | 0.200 |
| Toner 31 | 20.00 | 17.89 | — | 2.11 | — | — | 12 | 1 | 11 | 0.913 | 28.7 | 33.0 | 0.194 |
| Toner 32 | 20.00 | — | — | — | — | — | 12 | — | — | 0.910 | 28.4 | 30.0 | 0.196 |
| Toner 33 | 19.99 | 18.79 | — | 1.20 | — | — | 15 | 4 | 11 | 0.915 | 29.9 | 34.5 | 0.198 |
| Toner 34 | 20.48 | 18.16 | 17.56 | 2.32 | 0.60 | 2.92 | — | 10 | — | 0.912 | 29.2 | 35.0 | 0.195 |
| Toner 35 | 20.00 | 18.16 | 18.11 | 1.84 | 0.05 | 1.89 | 12 | 10 | 2 | 0.980 | 42.2 | 88.0 | 0.175 |

In Table 4, the units of the SP value are $(J/cm^3)^{1/2}$, and CV is the coefficient of variation of the occupied area ratio of the magnetic body.

Production Example of Toner 22

Production Example of Toner by Emulsification Aggregation

Preparation of a Binder Resin Dispersion

Binder resin A1 was dissolved in 150.0 parts of toluene, and thereafter the resulting solution was added to 300 parts of ion-exchanged water, followed by addition of 1.0 part of an anionic surfactant (Neogen RK, by DKS Co. Ltd.), with stirring in a homogenizer (Ultraturrax T50, by IKA KK). Thereafter, toluene was separated by distillation, to yield a binder resin dispersion. The solids concentration in a resin particle dispersion D1 was adjusted to 25.0 mass % through addition of ion-exchanged water.

Preparation of a Wax Dispersion

| | |
|---|---|
| Ester compound (ethylene glycol distearate) | 25.0 parts |
| Hydrocarbon wax (Fischer-Tropsch wax; melting point 77° C.) | 25.0 parts |
| Anionic surfactant (Neogen RK, by DKS Co., Ltd.) | 0.3 parts |
| Ion-exchanged water | 150.0 parts |

The above materials were mixed, heated at 95° C., and dispersed using a homogenizer (Ultraturrax T50 by IKA KK). This was followed by a dispersion treatment in a Manton-Gaulin high-pressure homogenizer (by Manton-Gaulin Manuf. Co., Inc.), to prepare a wax dispersion (solids concentration: 25.0 mass %) resulting from dispersion of wax particles.

Preparation of a Magnetic Body Dispersion

| | |
|---|---|
| Magnetic body B1 | 25.0 parts |
| Ion-exchanged water | 75.0 parts |

The above materials were mixed, and dispersed at 133.3 $s^{-1}$ for 10 minutes using a homogenizer (Ultraturrax T50, by IKA KK), to yield a magnetic body dispersion in which the concentration of magnetic body fine particles was 25.0 mass %.

Production of Toner

| | |
|---|---|
| Resin particle dispersion (solids 25.0 mass %) | 150.0 parts |
| Wax dispersion (solids 25.0 mass %) | 15.0 parts |
| Magnetic body dispersion (solids 25.0 mass %) | 97.5 parts |

The above materials were placed in a beaker, and were adjusted so that the total number of parts of water was 250, and the temperature was adjusted to 30.0° C. Thereafter, the whole was mixed at 83.3 $s^{-1}$ for 1 minute, using a homogenizer (Ultraturrax T50, by IKA KK).

Further, 10.0 parts of a 2.0 mass % aqueous solution of magnesium sulfate as a flocculant were added gradually.

The resulting starting material dispersion was transferred to a polymerization kettle equipped with a stirrer and a thermometer, and was heated there at 50.0° C. with a mantle heater, with stirring to promote the growth of aggregated particles.

Once 60 minutes had elapsed, 200.0 parts of a 5.0 mass % aqueous solution of ethylenediaminetetraacetic acid (EDTA) were added, to prepare Aggregated particle dispersion 1.

The pH of Aggregated particle dispersion 1 was subsequently adjusted to 8.0 using a 0.1 mol/L aqueous solution of sodium hydroxide, after which Aggregated particle dispersion 1 was heated to 80.0° C., and allowed to stand for 180 minutes, to cause the aggregated particles to coalesce.

After 180 minutes elapsed a toner particle dispersion was obtained having the toner particle dispersed therein. The product was cooled at a ramp down rate of 1.0° C./minute, after which the resulting Toner particle dispersion 1 was filtered and washed under flow of ion-exchanged water, and a cake-like toner particle was retrieved once the conductivity of the filtrate became 50 mS or lower.

Next, the cake-like toner particle was placed in ion-exchanged water in an amount of 20 times the mass of the toner particle, and the whole was stirred using a Three-One motor to thoroughly loosen the toner particle, followed by filtration and water-flow washing once again, with subsequent solid-liquid separation. The obtained cake-like toner particle was deagglomerated, in a sample mill, and was dried in an oven at 40° C. for 24 hours. Further, the obtained powder was deagglomerated in a sample mill and was then further vacuum-dried in an oven at 40° C. for 5 hours, to yield a magnetic toner particle.

Then 1.2 parts of hydrophobized silica fine particles (resulting from a hydrophobic treatment of 100 parts of silica fine particles having a BET specific surface area of 150 $m^2/g$ with 30 parts (100CS) of dimethyl silicone oil) were externally added to, and mixed with, 100 parts of the above magnetic toner particle, using FM mixer (FM-75 model, by Nippon Coke & Engineering Co., Ltd.), and the resulting mixture was sifted with a sieve having an 150 μm opening mesh, to yield Toner 22. Table 4 sets out the physical properties of the toner.

Production Example of Toner 35

Toner 35 was obtained in the same way as in the production example of Toner 22, but herein the pre-aggregation step below was carried out for the produced magnetic body dispersion. Table 4 sets out the physical properties of the toner.

Pre-Aggregation Step

| | |
|---|---|
| Magnetic body dispersion (solids 25.0 mass %) | 105.0 parts |

The above material was placed in a beaker, and the temperature was adjusted to 30.0° C., followed by stirring at 83.3 $s^{-1}$ for one minute, using a homogenizer (Ultraturrax T50 by IKA KK). Further, 1.0 part of a 2.0 mass % aqueous solution of magnesium sulfate as a flocculant was gradually added, with stirring for 1 minute.

Examples 1 to 28, Comparative Examples 1 to 7

The following evaluations were performed using Toners 1 to 35. The evaluation results are given in Table 5.

Herein HP LaserJet Enterprise M609dn, modified to have a process speed of 410 mm/sec, was used in the evaluations.

Vitality (by Xerox, basis weight 75 $g/cm^2$, letter size) was used as the evaluation paper.

Evaluation of Low-Temperature Fixability

In a rubbing test, a fixing unit of the above evaluation apparatus was taken out, and an external fixing unit configured so that the temperature thereof could be arbitrarily set and so that the process speed thereof was 410 mm/sec, was used instead.

Using the above device, a solid black unfixed image in which the toner laid-on level per unit area was set to 0.5 mg/cm$^2$ was run, in a normal-temperature, normal-humidity environment (temperature 25° C., humidity 50% RH), through a fixing unit the temperature whereof was controlled to the set temperature. The obtained fixed image was rubbed 5 times back and forth with lens-cleaning paper, while under application of a load of 4.9 kPa (50 g/cm$^2$), and the temperature at which a concentration decrease rate from before to after the rubbing test was 10% or lower was taken as the fixation temperature. A rating of C or higher was deemed as good. Image density was measured with a Macbeth densitometer (by Macbeth Corporation), which is a reflection densitometer, using an SPI filter.

Evaluation Criteria

A: Fixation temperature lower than 200° C.

B: Fixation temperature from 200° C. to less than 210° C.

C: Fixation temperature from 210° C. to less than 220° C.

D: Fixation temperature of 220° C. or higher

Evaluation of Scratch Resistance

To evaluate scratch resistance, the fixing unit of the above evaluation apparatus was taken out, and an external fixing unit configured so that the temperature thereof could be arbitrarily set, and so that the process speed thereof was 450 mm/sec, was used instead. Fixing was performed at the fixation temperature of the each respective toner obtained in the low-temperature fixability evaluation described above.

Once a solid black unfixed image was obtained that had a toner laid-on level of 0.50 mg/cm$^2$, the external fixing apparatus was thereafter set to the fixation temperature of each toner, and fixing was carried out in a normal-temperature, normal-humidity environment (temperature 25° C., humidity 50% RH). The obtained fixed image was rubbed back and forth 10 times with a piece of blank evaluation paper (rub paper) having part thereof cut out, and while under application of a load of 4.9 kPa (50 g/cm$^2$). The reflection density of the rub paper after rubbing, and of the blank evaluation paper remaining when the rub paper was cut out, was measured using a reflectance meter (reflectometer model TC-6DS, by Tokyo Denshoku Co., Ltd.), and the scratch resistance of the fixed image was evaluated on the basis of the difference in reflection density. A rating of C or higher was deemed as good.

Evaluation Criteria

A: Reflection density difference smaller than 1.0

B: Reflection density difference from 1.0 to less than 2.0

C: Reflection density difference from 2.0 to less than 3.0

D: Reflection density difference of 3.0 or more

Evaluation of Non-Fixation Speckles

To evaluate non-fixation speckles, the fixing unit of the above evaluation apparatus was taken out, and an external fixing unit configured so that the temperature thereof could be arbitrarily set, and so that the process speed thereof was 450 mm/sec, was used instead.

Using the above device, a whole-surface solid black unfixed image having a toner laid-on level per unit area set to 1.0 mg/cm$^2$ was run, in a low-temperature, low-humidity environment (temperature 15° C., humidity 10% RH), through a fixing unit the temperature whereof was set to the fixation temperature of each toner. The obtained image was visually checked, and the number of sites of speckles of non-fixed toner where the toner was insufficiently fixed was counted, and such non-fixation speckles were evaluated in accordance with the criteria below. A rating of C or higher was deemed as good.

Evaluation Criteria

A: Number of non-fixation speckles smaller than 4

B: Number of non-fixation speckles from 4 to less than 8.

C: Number of non-fixation speckles from 8 to less than 12.

D: Number of non-fixation speckles equal to or greater than 12

Evaluation of Fusion of the Toner to the Drum

Fusion of the toner to the drum was evaluated in a high-temperature, high-humidity environment (temperature 30° C., humidity 80% RH) using the above evaluation apparatus. A horizontal-line pattern having a print percentage of 5% was continuously outputted over 20000 prints, after which a whole-surface solid black image having a toner laid-on level per unit area set to 1.0 mg/cm$^2$ was outputted, and the surface of the photosensitive drum and the whole-surface solid black image were checked visually. Fusion of the toner to the drum was evaluated in accordance with the following criteria. A rating of C or higher was deemed as good.

Evaluation Criteria

A: No observable toner fusion on the photosensitive member.

B: Slight toner fusion observable on the photosensitive member, but not apparent on the image.

C: Blank spots of missing image observable on the solid black image.

D: Blank speckles, trailing from a missing-image spot, observable on the solid black image.

Evaluation of Heat-Resistant Storability

A resin cup (100 mL) holding 5.0 g of an evaluation toner sample was allowed to stand in a high-temperature environment (temperature 50° C., humidity 50% RH) for 3 days. The sample was thereafter transferred to a normal-temperature, normal-humidity environment (temperature 25° C., humidity 50% RH), and was allowed to stand for 1 hour. The toner residual amount was measured in a normal-temperature, normal-humidity environment (temperature 23° C./relative humidity 50%) using "Powder Tester PT-X" (by Hosokawa Micron Corporation) as the measuring device, and utilizing a sieve having a 75 μm mesh opening. The amplitude of the sieve was adjusted to 1.00 mm (peak-to-peak), the toner for evaluation was placed on the sieve, and vibration was applied for 40 seconds. Thereafter heat-resistant storability was evaluated on the basis of the amount of toner aggregates remaining on the sieve, and was rated in accordance with the evaluation criteria below. A rating of C or higher was deemed as good.

Evaluation Criteria

A: Toner residual amount on the mesh of 0.20 g or less.

B: Toner residual amount on the mesh exceeds 0.20 g, up to 0.40 g.

C: Toner residual amount on the mesh exceeds 0.40 g, up to 0.60 g.

D: Toner residual amount on the mesh exceeds 0.60 g.

TABLE 5

| | Toner | Low-temperature fixability | | Scratch resistance | | Non-fixation speckles | | Fusion on drum | Heat-resistant storability | |
|---|---|---|---|---|---|---|---|---|---|---|
| Example 1 | 1 | A | 195 | A | 0.5 | A | 2 | A | A | 0.10 |
| Example 2 | 2 | A | 192 | A | 0.8 | A | 0 | A | A | 0.12 |
| Example 3 | 3 | A | 197 | A | 0.6 | A | 3 | A | A | 0.12 |
| Example 4 | 4 | B | 206 | A | 0.9 | A | 3 | A | A | 0.14 |
| Example 5 | 5 | A | 190 | A | 0.2 | B | 6 | A | A | 0.15 |
| Example 6 | 6 | A | 198 | B | 1.4 | A | 3 | A | A | 0.15 |
| Example 7 | 7 | A | 194 | B | 1.5 | B | 7 | A | A | 0.12 |
| Example 8 | 8 | A | 195 | A | 0.8 | A | 1 | A | A | 0.18 |
| Example 9 | 9 | A | 195 | A | 0.4 | A | 1 | A | A | 0.15 |
| Example 10 | 10 | A | 194 | A | 0.5 | A | 2 | A | A | 0.14 |
| Example 11 | 11 | A | 196 | A | 0.5 | A | 1 | A | A | 0.13 |
| Example 12 | 12 | A | 193 | B | 1.6 | A | 1 | A | A | 0.10 |
| Example 13 | 13 | B | 207 | A | 0.6 | B | 6 | A | A | 0.15 |
| Example 14 | 14 | A | 195 | A | 0.6 | A | 1 | A | A | 0.13 |
| Example 15 | 15 | B | 205 | A | 0.6 | B | 5 | A | A | 0.15 |
| Example 16 | 16 | B | 204 | B | 1.3 | B | 6 | A | A | 0.18 |
| Example 17 | 17 | A | 194 | B | 1.3 | A | 2 | A | A | 0.11 |
| Example 18 | 18 | A | 193 | C | 2.4 | A | 2 | A | A | 0.15 |
| Example 19 | 19 | A | 196 | C | 2.2 | A | 1 | A | A | 0.12 |
| Example 20 | 20 | A | 190 | B | 1.8 | A | 2 | A | A | 0.16 |
| Example 21 | 21 | A | 195 | B | 1.5 | A | 2 | B | A | 0.16 |
| Example 22 | 22 | A | 197 | B | 1.4 | C | 9 | A | A | 0.16 |
| Example 23 | 23 | A | 194 | B | 1.8 | B | 6 | A | A | 0.12 |
| Example 24 | 24 | A | 195 | B | 1.8 | A | 2 | C | A | 0.12 |
| Example 25 | 25 | A | 199 | A | 0.5 | A | 2 | A | B | 0.30 |
| Example 26 | 26 | B | 206 | A | 0.8 | B | 5 | A | C | 0.48 |
| Example 27 | 27 | B | 208 | A | 0.8 | C | 8 | A | A | 0.17 |
| Example 28 | 28 | C | 215 | B | 1.6 | C | 9 | B | A | 0.16 |
| Comparative Example 1 | 29 | B | 204 | D | 3.2 | B | 6 | C | A | 0.16 |
| Comparative Example 2 | 30 | C | 216 | D | 3.1 | C | 9 | C | A | 0.15 |
| Comparative Example 3 | 31 | C | 216 | D | 3.2 | C | 10 | C | A | 0.13 |
| Comparative Example 4 | 32 | C | 218 | D | 3.4 | C | 10 | C | A | 0.10 |
| Comparative Example 5 | 33 | C | 214 | D | 3.2 | C | 10 | C | A | 0.15 |
| Comparative Example 6 | 34 | C | 212 | A | 0.4 | A | 8 | B | D | 0.85 |
| Comparative Example 7 | 35 | A | 198 | D | 3.2 | D | 14 | A | A | 0.12 |

In Table 5, the numerical value of low-temperature fixability represents the fixation temperature (° C.), the numerical value of scratch resistance represents a reflection density difference, the numerical value of non-fixation speckles represents the number of such speckles, and the numerical value of heat-resistant storability represents the toner residual amount (g) on the mesh.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-171623, filed Oct. 20, 2021, which is hereby incorporated by reference herein in its entirety.

What is claimed is:

1. A magnetic toner, comprising:

a toner particle comprising a binder resin, a magnetic body and an external additive;

the binder resin comprising a styrene-acrylic resin, the styrene-acrylic resin comprising monomer units represented by Formulae (1) and (5), and a monomer unit corresponding to n-butyl acrylate (1)

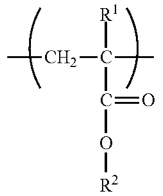

(5)

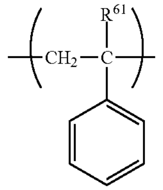

where $R^1$ represents a hydrogen atom or a methyl group, $R^2$ represents a linear alkyl group having $C_B$ carbon atoms, $C_B$ is an integer of 10 to 15, and $R^{61}$ represents a hydrogen atom or a methyl group;

a content ratio of the monomer unit represented by Formula (1) in the styrene-acrylic resin being 1.0 to 10.0 mass %;

the external additive comprising a silicone oil-treated silica; and the magnetic body being surface-treated with a compound having an alkyl group having $C_M$ carbon atoms, where $C_M$ is an integer from 4 to 20, wherein an average circularity of the magnetic toner is 0.940 to 0.995, $$|C_M - C_B| \leq 8, \text{ and}$$

in a cross-sectional observation of the magnetic toner using a transmission electron microscope, a coefficient of variation of an occupied area ratio of the magnetic body in a square grid, resulting from demarcating a cross section of the magnetic toner in a grid of 0.8 μm-side squares, is 60.0% or lower.

2. The magnetic toner according to claim 1, wherein $C_B$ is 12.

3. The magnetic toner according to claim 1, wherein the toner particle comprises an ester compound, the ester compound being at least one member selected from the group consisting of ester compounds represented by Formulae (6)-(8)

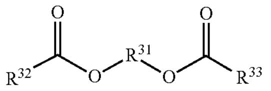
(6)

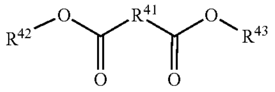
(7)

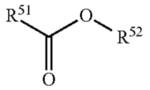
(8)

where $R^{31}$ and $R^{41}$ represent independently an alkylene group having 2 to 8 carbon atoms, and $R^{32}$, $R^{33}$, $R^{42}$, $R^{43}$, $R^{51}$ and $R^{52}$ represent independently a linear alkyl group having 14 to 24 carbon atoms.

4. The magnetic toner according to claim 1, which has a thermal conductivity of 0.190 W/mK or higher measured in accordance with a hot-disk method.

5. The magnetic toner according to claim 1, wherein primary particles of the magnetic body have a number-average particle diameter of 50 to 500 nm, and a standard deviation of the number-average particle diameter of the primary particles of the magnetic body is 50 to 90 nm.

6. The magnetic toner according to claim 3, wherein an absolute value of SPb−SPw is 2.50 or less, when SPb $(J/cm^3)^{1/2}$ is a SP value of the styrene-acrylic resin and SPw $(J/cm^3)^{1/2}$ is a SP value of the ester compound.

7. The magnetic toner according to claim 3, wherein an absolute value of SPm−SPw is 1.10 or less, when SPm $(J/cm^3)^{1/2}$ is a SP value of the compound having an alkyl group having $C_M$ carbon atoms and SPw $(J/cm^3)^{1/2}$ is a SP value of the ester compound.

* * * * *